United States Patent
Yuan et al.

(10) Patent No.: US 12,283,128 B2
(45) Date of Patent: Apr. 22, 2025

(54) DATA PROCESSING METHOD AND APPARATUS

(71) Applicant: Honor Device Co., Ltd., Guangdong (CN)

(72) Inventors: Jiangfeng Yuan, Shenzhen (CN); Zhichao Li, Shenzhen (CN); Yichao Zhang, Shenzhen (CN); Junwei Zhou, Shenzhen (CN); Jianming Lv, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 191 days.

(21) Appl. No.: 17/983,650

(22) Filed: Nov. 9, 2022

(65) Prior Publication Data

US 2023/0064281 A1    Mar. 2, 2023

Related U.S. Application Data

(63) Continuation of application No. PCT/CN2022/092042, filed on May 10, 2022.

(30) Foreign Application Priority Data

Aug. 12, 2021 (CN) .......................... 202110924492.3

(51) Int. Cl.
 *H04N 7/18* (2006.01)
 *G01S 17/894* (2020.01)
 *G06V 40/16* (2022.01)

(52) U.S. Cl.
 CPC .......... *G06V 40/172* (2022.01); *G01S 17/894* (2020.01)

(58) Field of Classification Search
 CPC ....................... G06V 40/172; G06V 17/894
 (Continued)

(56) References Cited

U.S. PATENT DOCUMENTS

| 11,145,071 B2 | 10/2021 | Chen et al. |
| 11,170,204 B2 * | 11/2021 | Guo ................. G06V 40/45 |

(Continued)

FOREIGN PATENT DOCUMENTS

| CN | 1976261 A * | 6/2007 | ............ G01M 11/00 |
| CN | 105224932 A | 1/2016 | |

(Continued)

OTHER PUBLICATIONS

Tong Jing et al., "3D Reconstruction of Non-rigid Shapes Using One TOF Camera," Journal of Computer-Aided Design & Computer Graphics, vol. 23, No. 3, pp. 377-384 (Mar. 2011).

(Continued)

*Primary Examiner* — Trang U Tran
(74) *Attorney, Agent, or Firm* — Leydig, Voit & Mayer, Ltd.

(57) ABSTRACT

This application provides a data processing method and an apparatus. The data processing method includes: acquiring a first frame of time-of-flight (TOF) data; processing the first frame of TOF data into a TOF image; and performing face recognition by using the first frame of TOF image to obtain a recognition result. When TOF data is used for face recognition, higher security can be achieved. In addition, the first frame of TOF image is used for face recognition immediately after the first frame of TOF image is obtained, so that the execution speed is high. Because the TOF data is less affected by light, a high-quality TOF image can be obtained even if the first frame of TOF data is used, and therefore, the recognition accuracy is high.

19 Claims, 19 Drawing Sheets

(58) Field of Classification Search
USPC .......................................................... 348/77
See application file for complete search history.

(56) References Cited

U.S. PATENT DOCUMENTS

| | | | |
|---|---|---|---|
| 11,580,779 B2* | 2/2023 | Zhang | G06F 21/32 |
| 2016/0006914 A1 | 1/2016 | Neumann | |
| 2018/0149748 A1* | 5/2018 | Yang | G06V 40/166 |
| 2019/0108409 A1* | 4/2019 | Zhou | G06V 10/17 |
| 2020/0125832 A1 | 4/2020 | Zhang et al. | |
| 2021/0406350 A1 | 12/2021 | Chen et al. | |

FOREIGN PATENT DOCUMENTS

| | | | | |
|---|---|---|---|---|
| CN | 107808127 | A | 3/2018 | |
| CN | 108288044 | A | 7/2018 | |
| CN | 108734001 | A | 11/2018 | |
| CN | 108769542 | A | 11/2018 | |
| CN | 108965732 | A | 12/2018 | |
| CN | 109040591 | A | 12/2018 | |
| CN | 109587407 | A | 4/2019 | |
| CN | 109635539 | A | 4/2019 | |
| CN | 109975821 | A | 7/2019 | |
| CN | 110324521 | A | 10/2019 | |
| CN | 110463183 | A | 11/2019 | |
| CN | 110555706 | A | 12/2019 | |
| CN | 110619200 | A | 12/2019 | |
| CN | 110933307 | A | 3/2020 | |
| CN | 210691384 | U * | 6/2020 | ............ G06Q 20/40 |
| CN | 112232324 | A | 1/2021 | |
| CN | 112330846 | A | 2/2021 | |
| CN | 113194226 | A | 7/2021 | |
| CN | 113780090 | A | 12/2021 | |
| EP | 4160475 | A1 | 4/2023 | |
| WO | 2021130076 | A1 | 7/2021 | |

OTHER PUBLICATIONS

Joongrock Kim et al, "Registration Method between ToF and Color cameras for Face Recognition," Department of Electrical and Electronic Engineering, Yonsei University, 2011 6th IEEE Conference on Industrial Electronics and Applications, pp. 1977-1980 (Jun. 21-23, 2011).

* cited by examiner

DATA PROCESSING METHOD AND APPARATUS

CROSS-REFERECNE TO RELATED APPLICATIONS

This application is a continuation of International Application No. PCT/CN2022/092042, filed on May 10, 2022, which claims priority to Chinese Patent Application No. 202110924492.3, filed on Aug. 12, 2021, both of which are incorporated by reference herein in their entireties.

TECHNICAL FIELD

This application relates to the field of electronic information, and in particular, to a data processing method and an apparatus.

BACKGROUND

Face recognition is widely used in electronic devices to identify authorized users. For example, for a face unlock function, it is determined whether to unlock a screen based on whether face recognition is successful.

In view of the foregoing scenario, malicious attacks need to be considered in terms of security. In terms of accuracy, the problem of inaccurate recognition results due to poor image quality needs to be considered; and in terms of user experience, the problem of delay needs to be considered.

It can be learned that the problem to be resolved is how to achieve face recognition safely, accurately, and quickly.

SUMMARY

This application provides a data processing method and an apparatus, so as to resolve the problem of how to achieve face recognition safely, accurately, and quickly.

To achieve the objective, this application provides the following technical solutions:

According to a first aspect, this application provides a data processing method, including: acquiring a first frame of time-of-flight TOF data; processing the first frame of TOF data into a first frame of TOF image; and performing face recognition by using the first frame of TOF image to obtain a first recognition result. When the TOF data is used for face recognition, higher security can be achieved. In addition, the first frame of TOF image generated from the first frame of TOF data may be used for face recognition to obtain a recognition result more quickly. In addition, the TOF data is less affected by light, and a high-quality TOF image can be obtained even if the first frame of TOF data is used, and therefore, the recognition accuracy is high.

Optionally, the collecting a first frame of TOF data includes: collecting the first frame of TOF data by using preset fixed exposure parameters.

Optionally, only one processor is used for serially executing: the processing the first frame of TOF data into a first frame of TOF image; and the performing face recognition by using the first frame of TOF image to obtain a first recognition result. Because the first frame of TOF image is used for face recognition, a higher speed can be achieved even if one processor is used to serially implement data processing and recognition.

Optionally, the method further includes: executing a task by using the first recognition result, to respond to an application-specific function based on face recognition of the TOF data.

Optionally, the executing a task by using the first recognition result includes: executing a first task if the first recognition result indicates that the recognition succeeds.

Optionally, the executing a task by using the first recognition result further includes: executing a second task if the first recognition result indicates that the recognition fails and meets a preset ending condition, where the ending condition includes: the time for executing the task reaches a preset time threshold. The setting of the ending condition reduces a response delay of the task while ensuring a recognition accuracy.

Optionally, the executing a task by using the first recognition result further includes: acquiring and using a recognition result of another frame of TOF data in response to the task if the first recognition result indicates that the recognition fails and does not meet a preset ending condition. If the preset condition is not met, face recognition will continue, which further improves the recognition accuracy.

Optionally, the method further includes: acquiring the first AE result after the collecting a first frame of TOF data. The another frame of TOF data is collected by using exposure parameters adjusted based on the first AE result, so that the quality of the another frame of TOF data can be improved, and a more accurate identification result can be obtained.

Optionally, the performing face recognition by using the first frame of TOF image to obtain a first recognition result includes: receiving, by a face trusted application in a trusted execution environment TEE, storage information of the first frame of TOF image, and then transmitting, by the face trusted application, the storage information of the first frame of TOF image to a face recognition module; reading, by the face recognition module, the first frame of TOF image based on the storage information of the first frame of TOF image; and performing, by the face recognition module, face recognition on the first frame of TOF image to obtain the first recognition result. Security can be further improved by implementing data processing and face recognition in the TEE.

Optionally, the processing the first frame of TOF data into a first frame of TOF image includes: receiving, by the face trusted application, storage information of the first frame of TOF data, and then transmitting, by the face trusted application, the storage information of the first frame of TOF data to a data processing module; reading, by the data processing module, the first frame of TOF data based on the storage information of the first frame of TOF data; and processing, by the data processing module, the first frame of TOF data into the first frame of TOF image. The storage information of the TOF data instead of the TOF data is transmitted, which further improves the security of the TOF data and saves transmission bandwidth resources.

Optionally, the method further includes: storing, by the data processing module, the first frame of TOF image, and transmitting the storage information of the first frame of TOF image to the face trusted application. The storage information of the TOF image is transmitted, which improves the security of the TOF image and saves transmission bandwidth resources.

Optionally, the performing face recognition by using the first frame of TOF image to obtain a first recognition result includes: generating, by a face client application at a hardware abstraction layer, the first frame of TOF image, and then performing face recognition by using the first frame of TOF image to obtain the first recognition result. A software framework implementation based on an Android operating system has high compatibility and implementability.

Optionally, the processing the first frame of TOF data into a first frame of TOF image includes: receiving, by the face client application, the first frame of TOF data, and processing the first frame of TOF data into the first frame of TOF image. A software framework implementation based on an Android operating system has high compatibility and implementability.

According to a second aspect, this application provides a data processing method, including: acquiring a first frame of TOF data; obtaining a first frame of TOF image and a first AE result by using the first frame of TOF data; acquiring an mth frame of TOF data, and then using the mth frame of TOF data to obtain an $mt^h$ frame of TOF image, where the mth frame of TOF data is the earliest TOF data collected based on the first AE result, and m is an integer greater than 1; and performing face recognition by using at least the mth frame of TOF image to obtain a recognition result. Because at least the $m^{th}$ frame of TOF image is used for face recognition, and the $m^{th}$ frame of TOF data is the earliest TOF data collected based on the first AE result, an accurate recognition result can be obtained with lower delay when the recognition of the first frame of TOF data fails.

Optionally, the collecting a first frame of TOF data includes: collecting the first frame of TOF data by using preset fixed exposure parameters.

Optionally, only one processor is used for serially executing: the obtaining a first frame of TOF image and a first AE result by using the first frame of TOF data; the obtaining an mth frame of TOF image by using the mth frame of TOF data; and the performing face recognition by using at least the $m^{th}$ frame of TOF image to obtain a recognition result, so as to be compatible with the scenario of one processor.

Optionally, the method further includes: executing a task by using the recognition result, to respond to an application-specific function based on a face recognition result for the TOF data.

Optionally, the executing a task by using the recognition result includes: executing a first task if the recognition result indicates that the recognition succeeds.

Optionally, the executing a task by using the recognition result further includes: executing a second task if the recognition result indicates that the recognition fails and meets a preset ending condition, where the ending condition includes: the time for executing the task reaches a preset time threshold. The setting of the ending condition reduces a response delay of the task while ensuring a recognition accuracy.

Optionally, the executing a task by using the recognition result further includes: acquiring and using recognition results of another three frames of TOF data in response to the task if the recognition result indicates that the recognition fails and does not meet a preset ending condition, so as to improve the accuracy of the recognition result.

Optionally, the performing face recognition by using at least the $m^{th}$ frame of TOF image to obtain a recognition result includes: performing face recognition by using the mth frame of TOF image to obtain an $m^{th}$ recognition result; and performing face recognition by using the first frame of TOF image to obtain a first recognition result if the $m^{th}$ recognition result indicates that the recognition fails. Because the $m^{th}$ frame of TOF image is generated by using the TOF data adjusted based on the first AE result, the quality is high. The use of the mth frame of TOF image for face recognition first helps obtain a more accurate recognition result as soon as possible.

Optionally, the performing face recognition by using at least the mth frame of TOF image to obtain a recognition result includes: receiving, by a face trusted application in a trusted execution environment TEE, storage information of at least $m^{th}$ frame of TOF image, and then transmitting, by the face trusted application, the storage information of the at least $m^{th}$ frame of TOF image to a face recognition module; reading, by the face recognition module, the at least $m^{th}$ frame of TOF image based on the storage information of the at least mth frame of TOF image; and performing, by the face recognition module, face recognition on the at least mth frame of TOF image to obtain the recognition result. Higher security can be achieved by implementing data processing and face recognition in the TEE.

Optionally, the processing the first frame of TOF data into a first frame of TOF image includes: receiving, by the face trusted application, storage information of the first frame of TOF data, and then transmitting, by the face trusted application, the storage information of the first frame of TOF data to a data processing module; reading, by the data processing module, the first frame of TOF data based on the storage information of the first frame of TOF data; and processing, by the data processing module, the first frame of TOF data into the first frame of TOF image. Only the storage information of the TOF data instead of the TOF data is transmitted, which further improves the security and saves transmission bandwidth resources.

Optionally, the method further includes: storing, by the data processing module, the first frame of TOF image, and transmitting the storage information of the first frame of TOF image to the face trusted application. Only the stored information of the TOF image instead of the TOF image is transmitted, which further improves the security and saves transmission bandwidth resources.

Optionally, the performing face recognition by using at least the mth frame of TOF image to obtain a recognition result includes: performing, by a face client application at a hardware abstraction layer, face recognition by using at least the $m^{th}$ frame of TOF image to obtain the recognition result.

Optionally, the obtaining a first frame of TOF image and a first AE result by using the first frame of TOF data includes: receiving, by the face client application, the first frame of TOF data, and processing the first frame of TOF data into the first frame of TOF image. The obtaining an mth frame of TOF image by using the $mt^h$ frame of TOF data includes: receiving, by the face client application, the $m^{th}$ frame of TOF data, and processing the mth frame of TOF data into the mth frame of TOF image. A software framework implementation based on an Android operating system has high compatibility and implementability.

According to a third aspect, this application provides a data processing method, including: acquiring an intensity value of ambient light.

The data processing method according to the first aspect of this application is used when the intensity value of ambient light is not greater than a preset first intensity threshold; or the data processing method according to the second aspect of this application is used when the intensity value of ambient light is greater than the first intensity threshold. Different data processing methods are selected based on intensity values of ambient light, so that a selected method is more suitable for the external environment. Therefore, a higher execution speed can be achieved while achieving security and accuracy.

According to a fourth aspect, this application provides an electronic device, including: a TOF camera, a memory, and a processor. The TOF camera is configured to collect TOF data. The memory is configured to store program code. The processor is configured to run the program code to implement the data processing method according to the first aspect, the second aspect, or the third aspect of this application.

According to a fifth aspect, this application provides a chip system, including: at least one processor and an interface, where the interface is configured to receive code instructions and transmit the code instructions to the at least one processor; and the at least one processor runs the code instructions to implement the data processing method according to the first aspect, the second aspect, or the third aspect of this application.

According to a sixth aspect, this application provides a readable storage medium, where the storage medium stores a program, and the program, when read and run by a computing device, implements the data processing method according to the first aspect, the second aspect, or the third aspect of this application.

DESCRIPTION OF EMBODIMENTS

Figure 1A:
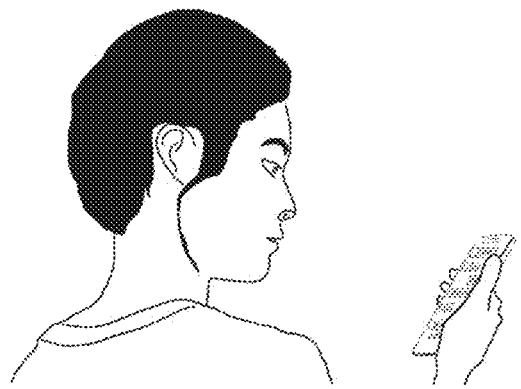
FIG. 1A is a diagram of an example of a scenario in which an electronic device is used for face recognition.

FIG. 1A shows a scenario in which face recognition is applied to an electronic device. When a user uses an electronic device (for example, a mobile phone) to achieve a function that requires user authorization, the user points a camera of the electronic device at the face spontaneously or based on a prompt message from the electronic device. At present, an electronic device is usually equipped with an RGB (Red Green Blue) camera. After collecting an image by using the RGB camera, the electronic device performs face recognition on the image. The face recognition includes, but is not limited to, comparison with a stored face template and anti-spoofing recognition. After a recognition result is obtained, a task is executed based on the recognition result.

For example, a user, expecting to unlock a screen with his/her face, points the screen of a mobile phone at the face to allow a front camera of the mobile phone to collect an image of the face. After collecting the image, the mobile phone performs face recognition on the image. If the recognition succeeds, the screen is unlocked; or if the recognition fails, the screen remains locked.

The inventors have found in the research that the security of electronic devices needs to be improved when recognition results are used to identify authorized users: current malicious attacks on faces may be mainly divided into print attacks (for example, using photos to pretend to be real faces), mask attacks (for example, using 3D models to pretend to be real faces), and spoofing with similar faces.

The inventors have also found in the research that the use of time-of-flight (TOF) data for face recognition has the following characteristics: 1. A depth image and an infrared image may be generated from TOF data, so that good anti-spoofing performance (that is, prevent head-on attacks and head mask attacks) is achieved. 2. TOF data is of high quality because the TOF data is less affected by light. Therefore, a higher threshold may be used for face comparison, thereby reducing the possibility of spoofing with similar faces. It can be learned that the security may be improved by using TOF data for face recognition.

However, current mainstream hardware platforms support only processing of RGB data, but not processing of TOF data. For example, an image signal processor (ISP) in current mainstream processors only supports processing of RGB camera raw data collected by RGB cameras into RGB raw data, but cannot process TOF data (for example, TOF Camera Data) collected by TOF cameras. However, it is too expensive to redesign a hardware platform to process the TOF data collected by TOF cameras. Therefore, a software framework is needed to process the TOF data collected by TOF cameras. Compared with hardware, software is more vulnerable to attacks. In this case, there are still security vulnerabilities even if the TOF data is used for face recognition.

The following embodiments of this application provide a face recognition method, applied to electronic devices, so as to improve the security of face recognition.

Figure 2:
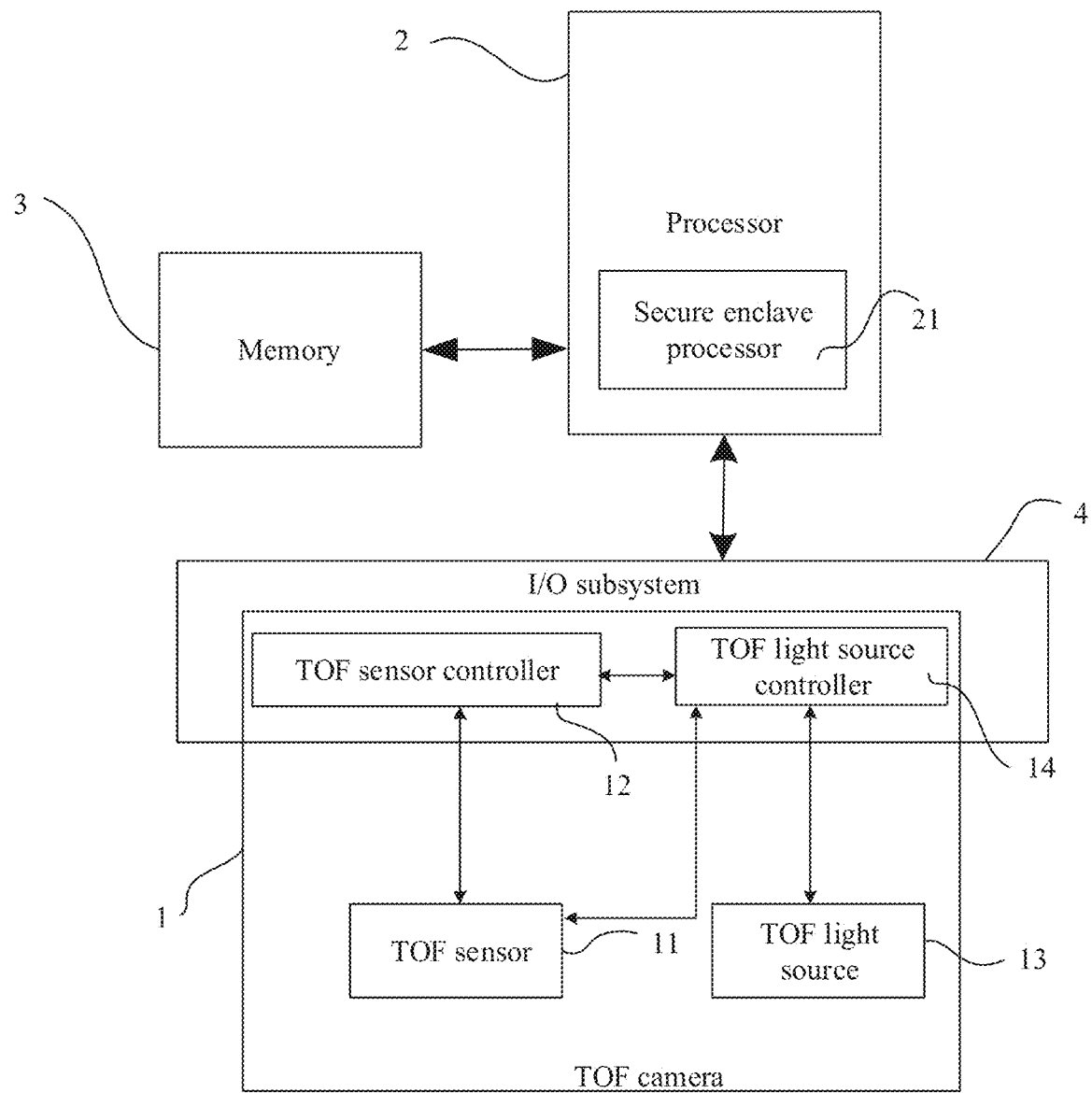
FIG. 2 is a schematic diagram of a structure of an electronic device according to an embodiment of this application.

FIG. 2 is a diagram of an example of an electronic device, including a TOF camera 1, a processor 2, a memory 3, and an I/O subsystem 4.

The TOF camera 1 is configured to collect TOF data. In some implementations, the TOF camera 1 is configured as a front camera of an electronic device to collect TOF data in front of a display (not shown in FIG. 2) of the electronic device, for example, collect TOF data of a human face in front of the display of the electronic device.

The TOF camera 1 includes a TOF sensor 11, a TOF sensor controller 12, a TOF light source 13, and a TOF light source controller 14.

In some implementations, the TOF light source controller 14 is controlled by the TOF sensor controller 12, to control the TOF light source 13. The TOF light source 13 emits infrared (IR) light under the control of the TOF light source controller 14. The TOF sensor 11 is configured to sense light that is obtained after infrared (IR) light is reflected from an object (for example, a human face), to collect TOF data.

The TOF sensor controller 12 and the TOF light source controller 14 are disposed in the I/O subsystem 4, and communicate with the processor 2 through the I/O subsystem 4.

The memory 3 may be configured to store computer executable program code. Specifically, the memory 3 may include a program storage area and a data storage area. The program storage area may store program code required for implementing an operating system, a software system, and at least one function. The data storage area may store data acquired, generated, and used during the use of electronic devices.

In some implementations, all or a part of the memory 3 may be integrated in the processor 2 as an internal memory of the processor 2. In some implementations, the memory 3 is an external memory relative to the processor 2, and communicates with the processor 2 through an external memory interface of the processor 2.

In some implementations, the memory 3 may include a high-speed random access memory, and may further include a non-volatile memory, such as at least one magnetic disk storage device, a flash memory device, or a universal flash storage (UFS).

The processor 2 may include one or more processing units. For example, the processor 2 may include an application processor (AP), a graphics processing unit (GPU), an image signal processor (ISP), or the like.

In some implementations, the processor 2 may include a secure enclave processor 21, and data used in face recognition may be stored in the secure enclave processor 21. The secure enclave processor 21 executes a processing procedure for these data by calling program code in the memory 3, so as to improve the security of face recognition.

In some implementations, the secure enclave processor 21 is configured to store TOF data collected by the TOF camera 1, generate a TOF image by using the TOF data, and perform face recognition processing by using the TOF image, to obtain a recognition result. The processor 2 may use the recognition result to execute a task such as face unlock or face recognition payment.

Optionally, the electronic device may further include an ambient light sensor (not shown in FIG. 2) to sense light intensity of an environment in which the electronic device is located. It may be understood that the ambient light sensor communicates with the processor 2 by using an ambient light sensor controller (not shown in FIG. 2) in the I/O subsystem 4.

It may be understood that the structure illustrated in this embodiment does not constitute a specific limitation to the electronic device. In some other embodiments, the electronic device may include more or fewer components than those illustrated, or combine some components, or split some components, or have different component arrangements. The illustrated components may be implemented by hardware, software, or a combination of software and hardware.

It may be understood that the operating system implemented by the processor 2 by running code stored in the memory 3 may be an iOS operating system, an Android open source operating system, a Windows operating system, a Harmony operating system, or the like. In the following embodiments, an Android open source operating system will be illustrated as an example.

Figure 3:
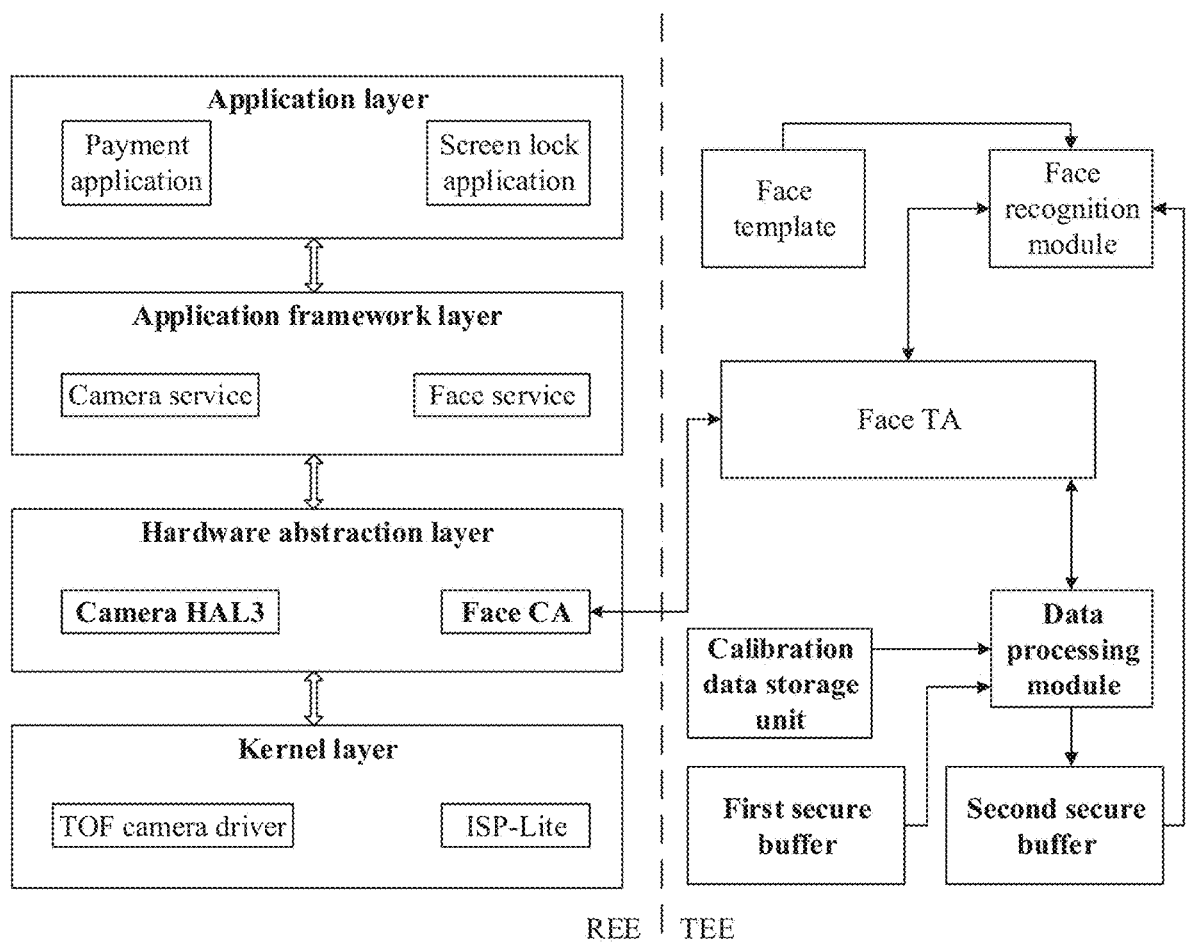
FIG. 3 is a schematic diagram of a software framework for face recognition of an electronic device according to an embodiment of this application.

The processor 2 of the electronic device runs program code stored in the memory 3, to implement a software framework based on the Android open source operating system as shown in FIG. 3.

The software framework includes a trusted execution environment (TEE), and a rich execution environment (REE) in which rich instructions may be executed. The TEE may be implemented by the secure enclave processor 21 in the processor 2 by running program code.

The REE includes all layers of the Android open source operating system, including but not limited to: an application layer, an application framework layer, a hardware abstraction layer, and a kernel layer.

The application layer may include a series of application packages. As shown in FIG. 3, the application packages may include a payment application and a screen lock application. Each application may initiate a task request in different scenarios to trigger face recognition.

The application framework layer provides an application programming interface (API) and a programming framework for applications at the application layer. The application framework layer includes some predefined functions. As shown in FIG. 3, the application framework layer may include a camera service and a face service. The camera service is used to implement a camera function. The face service is used to implement a face recognition function.

The hardware abstraction layer is used to abstract hardware. The hardware abstraction layer hides details of hardware interfaces of a specific platform, provides a virtual hardware platform for the operating system, so that the operating system is hardware-independent, and is portable across various platforms. A camera hardware abstraction layer (Camera HAL3) at the hardware abstraction layer is used to control the camera in response to instructions of the camera service. A face client application (Face CA) accesses a trusted application in the TEE by calling an Application Programming Interface (API) of a TEE client in the REE, so as to use security functions provided by the TEE and the trusted application.

The kernel layer is a layer between hardware and software. Software driver of hardware is usually provided at the kernel layer. In FIG. 3, one of the functions of ISP-Lite at the kernel layer is to drive the ISP-Lite (a part of ISP) in the processor, and convert TOF data (such as TOF camera Raw Data) collected by the TOF sensor into a data format commonly used for image processing, such as TOF raw data (Raw Data). In the following embodiments, data processed by the ISP-Lite and TOF data collected by the TOF camera are collectively referred to as TOF data. A TOF camera driver at the kernel layer is used to drive the TOF camera. The TEE includes applications, modules, and units for face recognition based on TOF data. A face trusted application (Face TA) is configured to schedule modules and units in the TEE, and communicates with the REE. A data processing module is configured to process data such as raw data. A face recognition module is configured to implement functions such as face recognition using face templates, and face template management.

Based on the framework shown in FIG. 3, the electronic device can process TOF data into a TOF image in the TEE, and use the TOF image for face recognition in the TEE to obtain a recognition result. That is, on the basis of using TOF data for face recognition to improve security, both data processing and recognition are implemented in the TEE, which can further improve security.

Figure 4A:
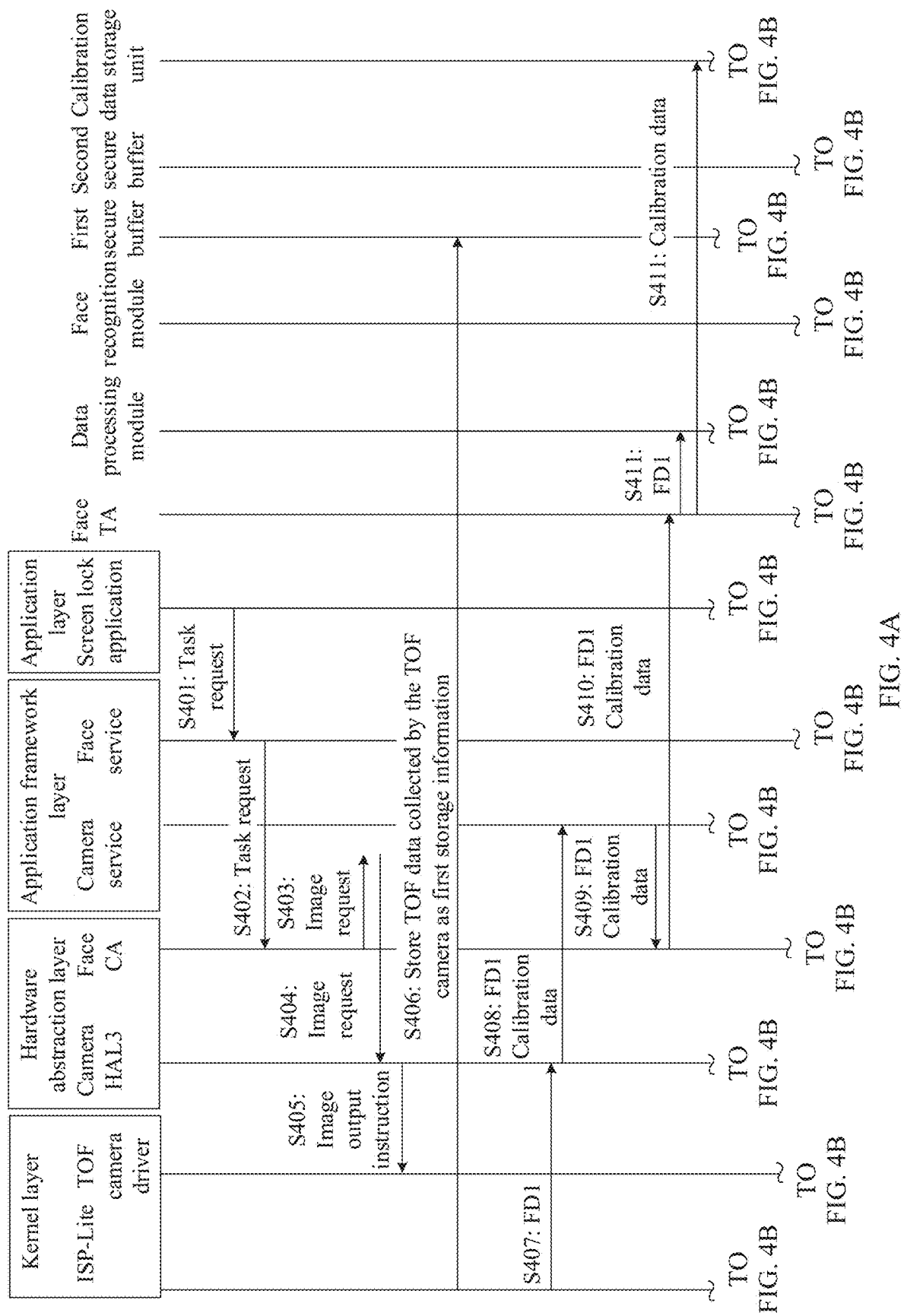
FIG. 4A-FIG. 4B are a flowchart of a face recognition method according to an embodiment of this application.
Figure 4B:
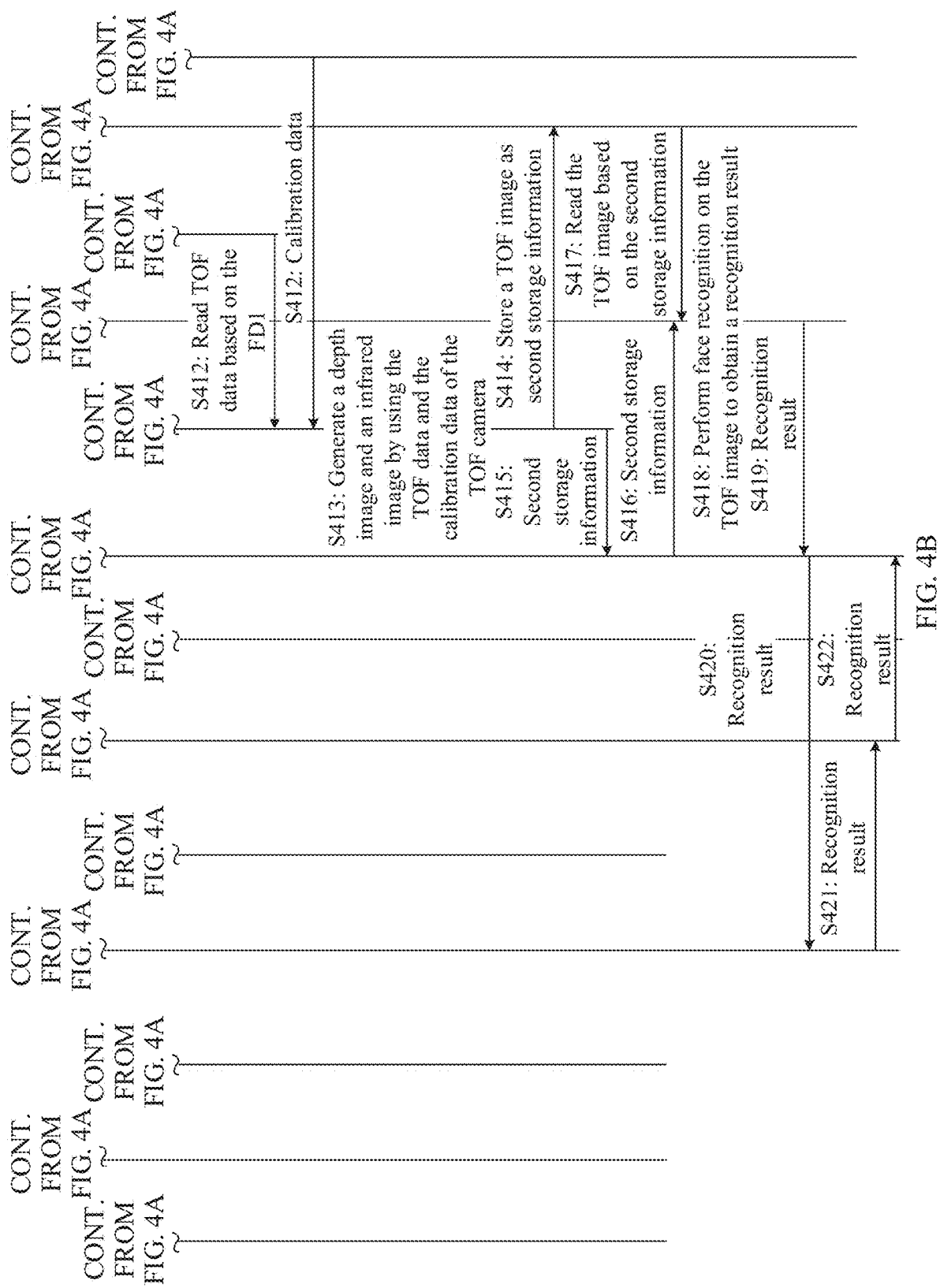

The face recognition method according to an embodiment of this application will be described in detail with reference to FIG. 3. As shown in FIG. 4A-FIG. 4B, the face recognition method performed by the electronic device according to the embodiment of this application includes the following steps:

S401: An application at the application layer transmits a task request to the face service at the application framework layer.

It may be understood that the application may initiate a task and send a task request to the face service in response to at least one instruction, at least one operation performed by a user, or at least one sensor signal, or periodically. Using a screen lock application as an example, a user presses a power key to trigger an unlock task, and an unlock application sends an unlock request to the face service.

S402: The face service transmits the task request to the face client application (Face CA) at the hardware abstraction layer.

S403: The face CA transmits an image request to the camera service at the application framework layer in response to the task request.

S404: The camera service transmits the image request to the camera hardware abstraction layer (Camera HAL3) at the hardware abstraction layer.

S405: In response to the image request, the camera HAL3 transmits an image output instruction to the TOF camera driver at the kernel layer to drive the TOF camera to collect TOF data.

S406: The ISP-Lite at the kernel layer stores received and processed TOF data in a first secure buffer in the TEE as first stored information. The first storage information indicates a storage address.

The ISP-Lite stores the received and processed TOF data in the TEE, which is equivalent to directly storing the TOF data in a secure enclave from hardware (ISP of the processor), and therefore, the possibility of being attacked is reduced.

S407: The ISP-Lite at the kernel layer transmits the first storage information to the camera HAL3 at the hardware abstraction layer.

Because the first storage information is transmitted in the REE, the first storage information may optionally be encrypted information, that is, ciphertext, to ensure the security of the first storage information. In this step, an example of encrypted information is a file descriptor (FD), which is used to describe a storage location and a reading method.

To facilitate the description, ciphertext of the first storage information is referred to as FD1.

S408: The camera HAL3 transmits FD1 and calibration data to the camera service at the application framework layer.

Because the generation of a subsequent TOF image requires calibration data, the camera HAL3 acquires the calibration data pre-configured in the REE and transmits the calibration data to the TEE together with the FD1.

Optionally, the camera HAL3 may acquire a part of calibration data from a storage unit in the REE and another part of calibration data from the TOF camera.

S409: The camera service transmits the FD1 and the calibration data to the face CA at the hardware abstraction layer.

S410: The face CA transmits the FD1 and the calibration data to the face trusted application (Face TA) in the TEE.

It may be understood that information interaction between modules at layers in the foregoing REE may follow a communication protocol for the layers.

Based on a framework of an existing operating system, storage information of TOF data is transmitted to the TEE, which lays a foundation for processing the TOF data in the TEE. In addition, the ISP-Lite stores received and processed TOF data in the TEE, thereby ensuring the security of the TOF data.

S411: The face TA in the TEE transmits the FD1 to a data processing module in the TEE, and stores the calibration data in a calibration data storage unit in the TEE.

S412: The data processing module reads TOF data from the first secure buffer based on the FD1, and reads the calibration data from the calibration data storage unit.

S413: The data processing module generates a depth image and an infrared image by using the TOF data and calibration data of the TOF camera.

S414: The data processing module stores a TOF image in a second secure buffer in the TEE as second storage information.

Because the foregoing operations are implemented in the TEE, the second storage information may be unencrypted.

S415: The data processing module transmits the second storage information to the face TA.

S416: The face TA transmits the second storage information to a face recognition module.

S417: The face recognition module reads the TOF image from the second secure buffer based on the second storage information.

S418: The face recognition module performs face recognition on the read TOF image to obtain a recognition result.

Specifically, the face recognition module performs face comparison on the TOF image by calling pre-configured face templates to obtain a comparison result, and uses the TOF image for anti-spoofing recognition to obtain an anti-spoofing result. The recognition result may be determined based on the comparison result and the anti-spoofing result. For example, if the comparison result is a comparison success and the anti-spoofing result is an anti-spoofing success, the recognition result is a recognition success.

As described above, because the TOF image includes a depth image and an infrared image, a higher comparison threshold may be used when comparing the infrared image with a face module. Therefore, the accuracy is high, which can reduce the possibility of spoofing with similar faces. Because the depth image and the infrared image may be used for anti-spoofing recognition at the same time, high anti-spoofing performance (that is, high performance against head-on attacks and head mask attacks) is achieved.

S419: The face recognition module transmits the recognition result to the face TA.

S420: The face TA in the REE transmits the recognition result to the face CA in the TEE.

S421: The face CA transmits the recognition result to the face service at the application framework layer.

S422: The face service transmits the recognition result to the application that initiates the task request at the application layer.

Using the screen lock application at the application layer as an example, after initiating an unlock request, the screen lock application receives a recognition result, and executes an unlock task based on the recognition result indicating that the recognition succeeds, or executes a task of keeping the screen locked based on the recognition result indicating that the recognition fails.

It may be understood that another application at the application layer initiates a task request and obtains a face recognition result by following a similar procedure. Details are not described herein again.

The face recognition method described in this embodiment uses TOF data for face recognition, and therefore has high security. Further, face recognition based on TOF data is implemented in the TEE, and therefore, the security of the TOF data, data processing and recognition processes may be guaranteed, so as to further improving the safety of face recognition.

In addition, based on layers of the Android operating system, the transmission of data storage information, recognition results and calibration data between the REE and the TEE is achieved with good compatibility.

It may be understood that, because the calibration data belongs to camera domain data rather than face domain data, in some implementations, the calibration data may also be transferred from the camera service to the face CA through the face service.

It may be understood that after the calibration data is stored in the calibration data storage unit in the TEE, the calibration data in the calibration data storage unit in the TEE will not be lost provided that the processor is not powered off, and therefore, it is unnecessary to reload the calibration data. Certainly, the calibration data may also be reloaded, which is not limited herein. The transmission of the calibration data together with the FD1 is only one implementation, and the calibration data and the FD1 may also be transmitted separately through transmission paths as described above.

It may be understood that one set of TOF data is collected at one exposure of the TOF camera, a plurality of sets of TOF data are collected at a plurality of successive exposures with a first time interval, followed by a plurality of successive exposures with the first time interval, and so on. A plurality of sets of TOF data collected successively is referred to as a frame of TOF data, and a plurality of sets of TOF data collected again after the first time interval is referred to as another frame of TOF data. Without considering processing delay and transmission delay of other modules, the ISP-Lite also sequentially stores each frame of TOF data in the first secure buffer at the first time interval, and sequentially transmits the storage information of each frame of TOF data to the face CA at the first time interval. The face CA also sequentially transmits the storage information of each frame of TOF data to the face TA at the first time interval. Therefore, the face TA also sequentially receives the storage information of each frame of TOF data at the first time interval. In FIG. 4A-FIG. 4B, any frame of TOF data may be stored in S406, an FD of any frame of TOF data may be transmitted in S407-S411, and S413-S419 show a processing procedure for this frame of TOF data. S420-S422 may be a processing procedure for a recognition result of this frame of TOF data or a processing procedure for a recognition result of a plurality of frames of TOF data.

Because the TOF camera collects TOF data by projecting infrared light, it is necessary to pay attention to the safety of human eyes during the collection. Because the quality of a TOF image is associated with the accuracy of a recognition result, and exposure parameters of the TOF camera are directly associated with the quality of the TOF image, it is necessary to optimize the exposure parameters of the TOF camera.

In the embodiment of this application, a procedure shown in FIG. 4A-FIG. 4B is further improved, and the data processing module may generate different parameters for adjusting the TOF camera based on the type of the received TOF data.

Figure 5A:
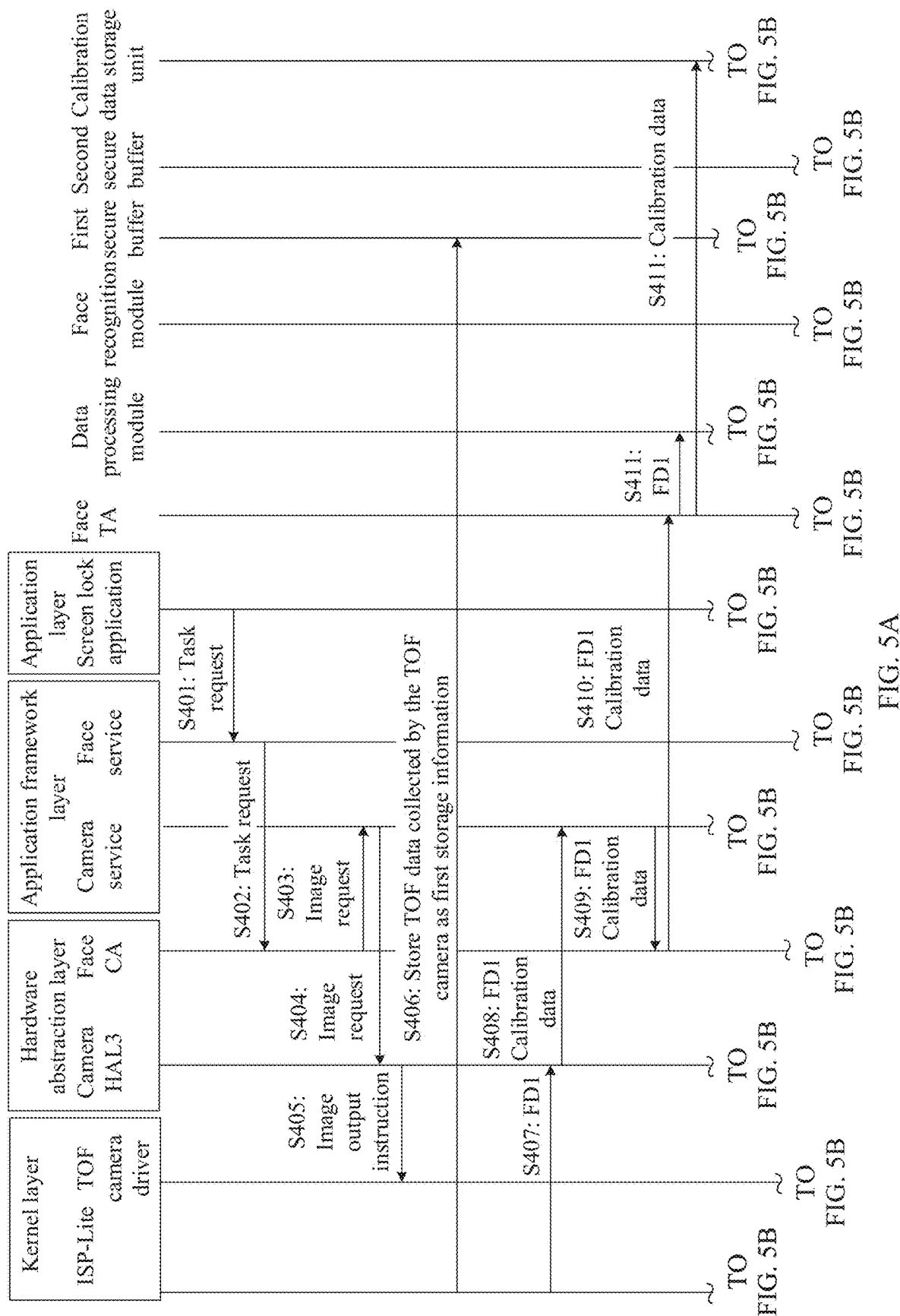
FIG. 5A-FIG. 5C are a flowchart of another face recognition method according to an embodiment of this application.
Figure 5B:
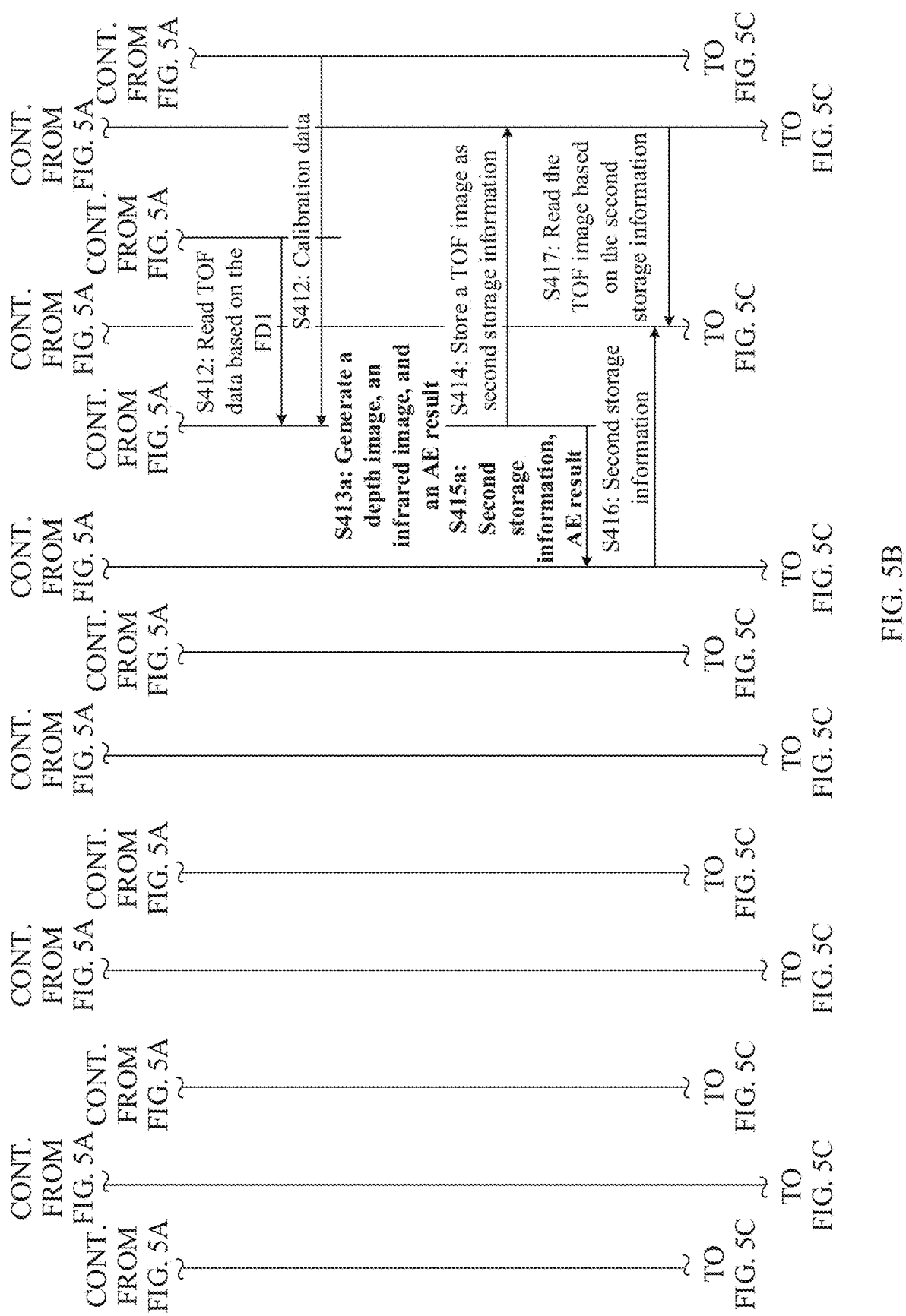
Figure 5C:
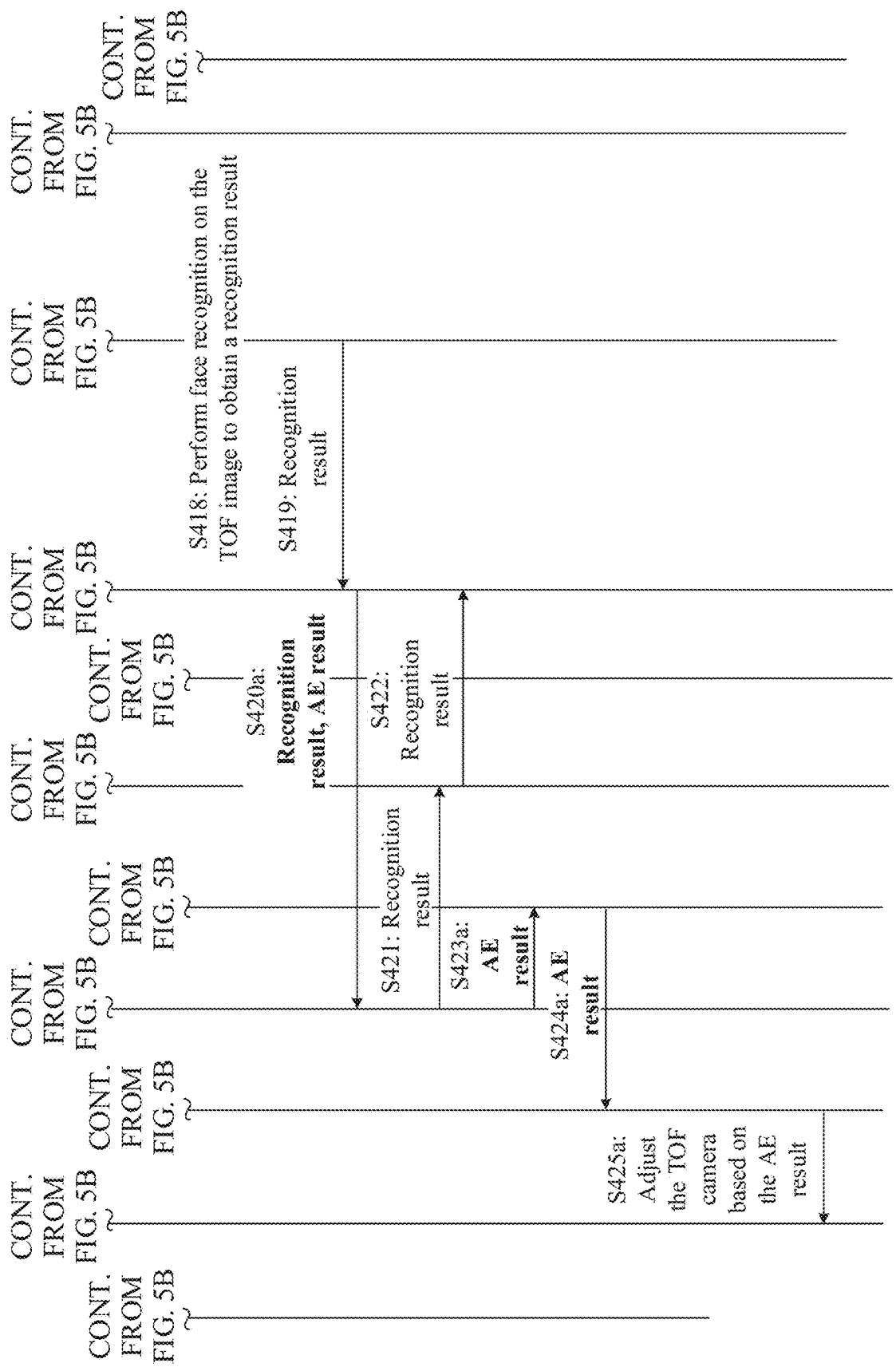

FIG. 5A-FIG. 5C show a procedure of generating and feeding back an automatic exposure (AE) result and controlling the camera based on the AE result. Only differences between FIG. 5A-FIG. 5C and FIG. 4A-FIG. 4B are described here.

S413a: The data processing module in the TEE generates a depth image, an infrared image, and an AE result in response to TOF data as a face recognition frame.

In the embodiment of this application, the TOF camera divides collected TOF data into security indicator frames and face recognition frames. The security indicator frames carry eye safety flags used to indicate whether infrared light emitted by the TOF camera is safe for human eyes. The face recognition frames are TOF data frames used for face recognition. In some implementations, the type of a TOF data frame is indicated by at least one of a value, a character, and a character string in the TOF data frame.

In some implementations, among collected TOF data, the first to fourth frames of TOF data are security indicator frames, and the subsequent frames of TOF data are face recognition frames. The security indicator frames include eye safety flags.

The AE result is used to adjust exposure parameters of the TOF camera. Optionally, the AE result includes, but is not limited to, exposure time and physical gain of the TOF sensor. A method for generating an AE result includes: extracting a face area from TOF raw data (that is, an original image), calculating a brightness value of the face area, and comparing the brightness value with a pre-configured target brightness value to obtain exposure time and physical gain of the TOF sensor. An AE result can be generated for each frame of TOF data, or for frames of TOF data.

S415a: The data processing module in the TEE transmits the second storage information and the AE result to the face TA in the TEE.

It may be understood that when the AE result of the previous frame of TOF data is the same as the latest AE result, the latest AE result may not be transmitted to save resources of the TEE.

S420a: The face TA in the TEE transmits the recognition result and the AE result to the face CA at the hardware abstraction layer in the REE.

S423a: The face CA transmits the AE result to the camera service at the application framework layer in the REE.

S424a: The camera service transmits the AE result to the camera HAL3 at the hardware abstraction layer.

S425a: The camera HAL3 adjusts the TOF camera through the TOF camera driver based on the AE result.

The camera HAL3 may send the AE result to the TOF sensor controller through the TOF camera driver, and the TOF sensor controller controls the TOF sensor to collect TOF data based on the AE result.

Figure 6A:
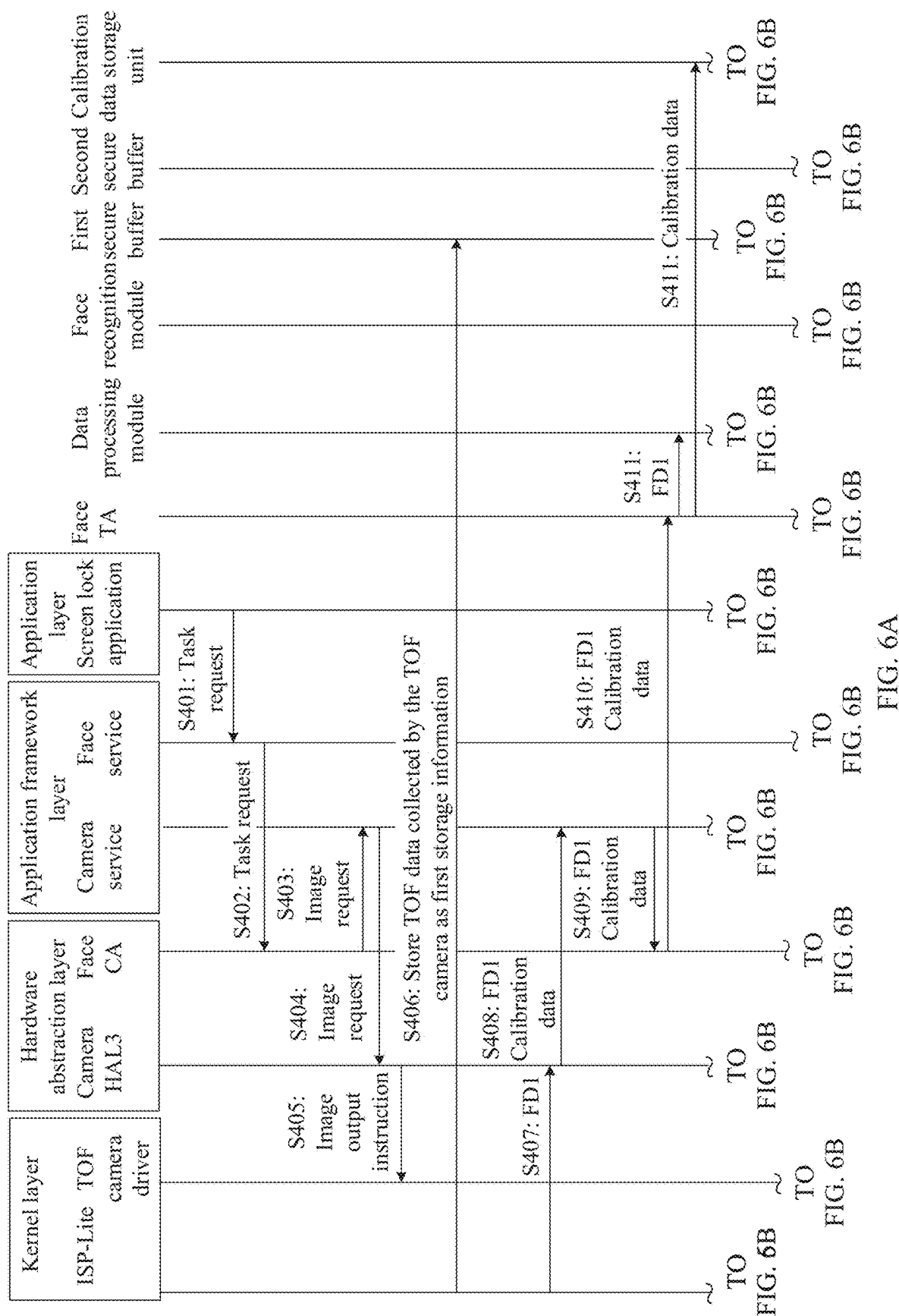
FIG. 6A-FIG. 6C are a flowchart of another face recognition method according to an embodiment of this application.
Figure 6B:
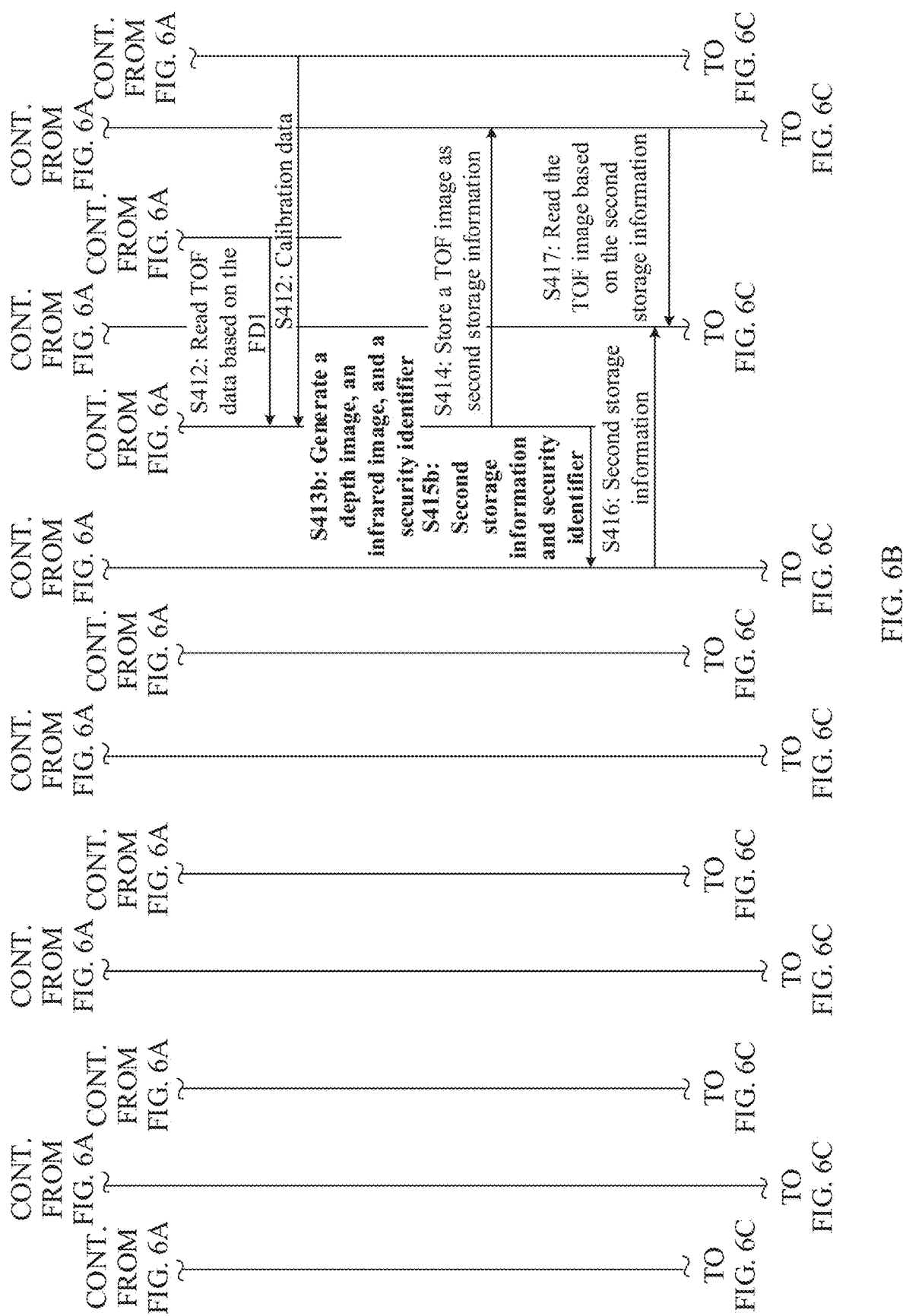
Figure 6C:
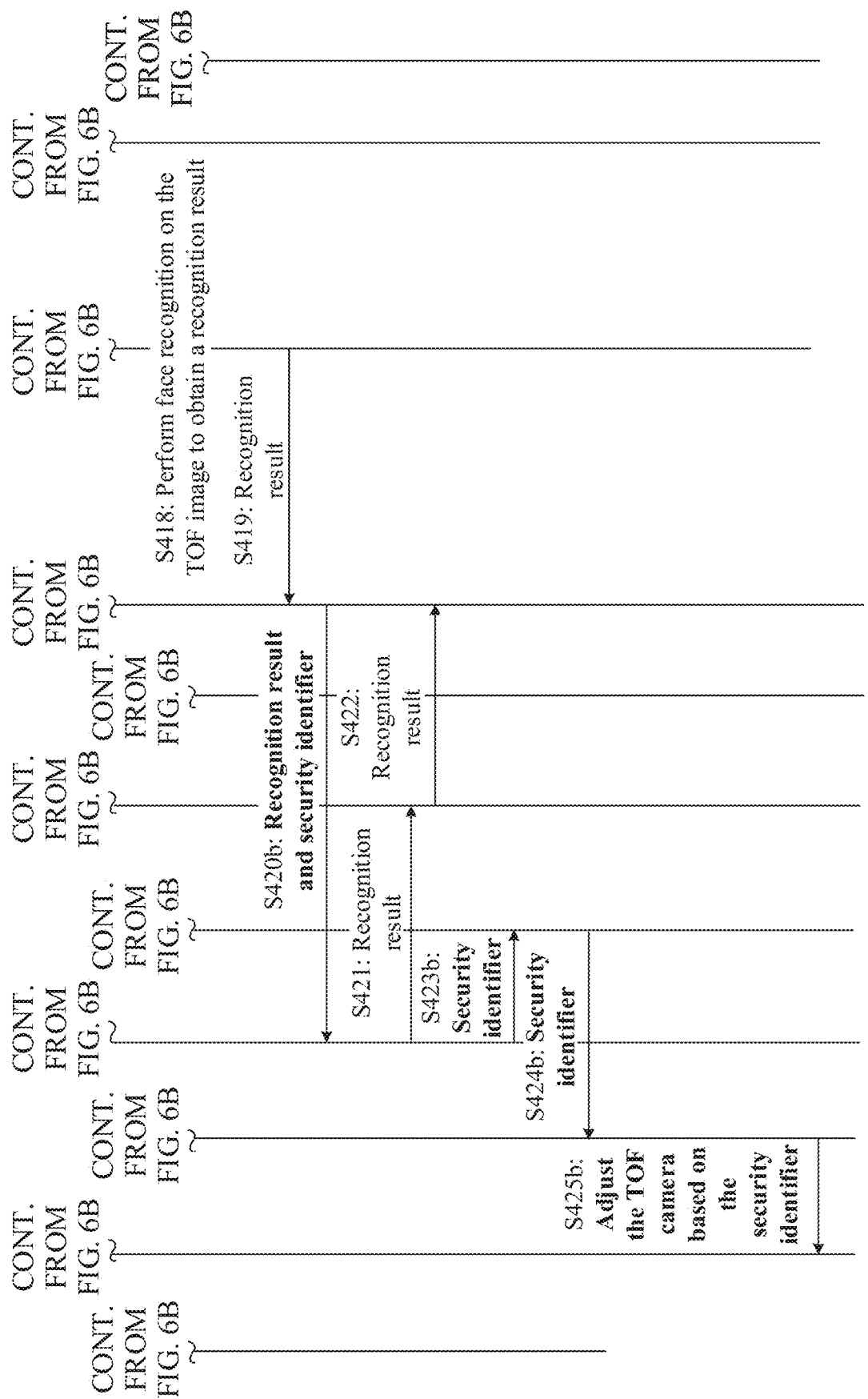

FIG. 6A-FIG. 6C show a procedure of generating and feeding back a security identifier and controlling the camera based on the security identifier. Only differences between FIG. 6A-FIG. 6C and FIG. 4A-FIG. 4B are described here.

S413b: The data processing module in the TEE generates a security identifier in response to the TOF data as security indicator frames.

The security identifier is used to indicate whether the TOF light source is safe for human eyes.

Optionally, a method for generating a security identifier includes: receiving a TOF data frame (that is, a security indicator frame) carrying an eye safety flag, then extracting the eye safety flag, and determining whether human eyes are safe based on the extracted eye safety flag to generate the security identifier. If the eye safety flag indicates safeness, a security identifier indicating safeness is obtained. If the eye safety flag indicates unsafeness, a security identifier indicating unsafeness is obtained.

S415b: The data processing module in the TEE transmits the second storage information and the security identifier to the face TA in the TEE.

Generally, during a process from start of collection to end of collection by the TOF camera, all security indicator frames carry the same eye safety flag. For example, in the first security indicator frame to the fourth security indicator frame, all eye safety flags indicate that human eyes are safe or unsafe. In this case, the plurality of security identifiers obtained are the same. Therefore, it is also possible to transmit only one security identifier to save resources of the TEE.

However, it is not excluded that in some cases, eye flags in a plurality of security indicator frames are different. Therefore, it is also possible to transmit only the last security identifier, that is, the security identifier determined based on the last received security indicator frame, so as to save resources of the TEE.

S420b: The face TA in the TEE transmits the recognition result and the security identifier to the face CA at the hardware abstraction layer in the REE.

S423b: The face CA transmits the security identifier to the camera service at the application framework layer in the REE.

S424b: The camera service transmits the security identifier to the camera HAL3 at the hardware abstraction layer.

S425b: The camera HAL3 transmits the TOF camera through the TOF camera driver based on the security identifier.

The adjusting the TOF camera includes, but is not limited to: turning off the TOF camera or reducing emission intensity of the TOF light source if the security identifier indicates that human eyes are unsafe; collecting TOF data frames and identifying these TOF data frames as TOF data frames (that is, face recognition frames) for face recognition if the security identifier indicates that human eyes are safe.

Based on FIG. 2, optionally, the camera HAL3 may send a turn-off instruction to the TOF sensor controller through the TOF camera driver to turn off the TOF camera.

In conclusion, after obtaining TOF raw data through the processor, the electronic device processes the TOF raw data into a TOF image in the TEE, and performs face recognition by using the TOF image, so that the face recognition has higher security.

In addition, based on layers of the Android system, storage information of TOF data is transmitted to the TEE, which not only lays a foundation for processing in the TEE, but also achieves compatibility with the Android system.

It can be learned that the foregoing framework and procedure described in this embodiment can achieve the purpose of using TOF data for face recognition to improve security, even if the processor of the electronic device does not support the generation of a TOF image.

Further, eye safety can be guaranteed and exposure parameters can be adjusted, so that the electronic device has better performance on the basis of improving the security of face recognition.

It may be understood that although the Android operating system is illustrated as an example in the foregoing FIG. 4A-FIG. 4B to FIG. 6A-FIG. 6C, the face recognition method according to the embodiments of this application is not limited to the Android operating system. For example, the operation of the TEE is not limited to the Android operating system, and therefore, functions of various applications, modules, and units in the TEE can also be achieved in other operating systems. The operation of the REE is not limited to the Android operating system. Therefore, a transmission path for transmitting TOF data and calibration data to the TEE, a transmission path for a task request and a feedback path for a recognition result can be adjusted based on different operating systems, provided that the TOF data and the calibration data can be transmitted from the REE to the TEE, the task request can trigger the collection of TOF data, and the recognition result can be used to execute a task.

The inventors have found that, in addition to security, there is room for improvement in the accuracy and execution speed of face recognition, that is, the following problems still exist in face recognition:

Inaccurate recognition results due to poor image quality: because of the influence of ambient light, data collected by a camera may have quality defects such as overexposure, blur and insufficient brightness, while face recognition is based on the data collected by the camera. Therefore, there may be the problem of incorrect comparison results, for example, face recognition for the same person fails.

Poor user experience due to excessive delay: with reference to the scenario shown in FIG. 1A, if face recognition is too slow and a user needs to wait for too long, comfort of the user will be reduced. Poor image quality is usually the cause of excessive delay.

There is a contradiction between improving image quality and improving execution speed: to improve image quality, it is necessary to iterate and denoise an image to allow the image to converge. More processing means correspond to a lower processing speed.

The inventors have also found in the research that TOF imaging has the following characteristics:

(1) TOF data collected by the TOF camera is less affected by ambient light, and therefore, in most scenarios, the quality of a first frame of TOF data (such as a first face recognition frame) collected by the TOF camera can meet the requirements of recognition accuracy. Therefore, in most scenarios, the first frame of TOF data can be used to obtain face recognition results with high accuracy.

Using a face unlock service as another example: assuming that a face attempting to unlock is a face already recorded in the electronic device, that is, the face attempting to unlock can unlock the screen. In this case, the unlock may be implemented through the first frame of TOF data.

(2) When a feedback adjustment mechanism (the feedback adjustment mechanism refers to adjustment of exposure parameters of subsequently collected data by using previously collected data and camera calibration data to improve image quality) takes effect, the convergence of TOF data (convergence means no more change) is fast, and about 3-4 frames of TOF data will converge.

In the foregoing example, assuming that the unlock is not implemented through the collected first frame of TOF data, when the exposure parameters are adjusted based on the feedback adjustment mechanism, the collected third or fourth frame of TOF data will converge (that is, the TOF data will not change even if the exposure parameters are adjusted later), then the unlock may be implemented through the collected third or fourth frame of TOF data.

Based on the foregoing characteristics of TOF imaging, TOF data is used for face recognition to improve security, which provides the possibility to give consideration to accuracy and speed.

In the following embodiments, based on the foregoing method of sequentially storing each frame of TOF data to the TEE at the first time interval, and transmitting the storage information of each frame of TOF data to the TEE, and based on the foregoing TOF imaging characteristics, the data processing module and the face recognition module are scheduled by the face TA to achieve the purpose of accurately and quickly obtaining recognition results.

Figure 7A:
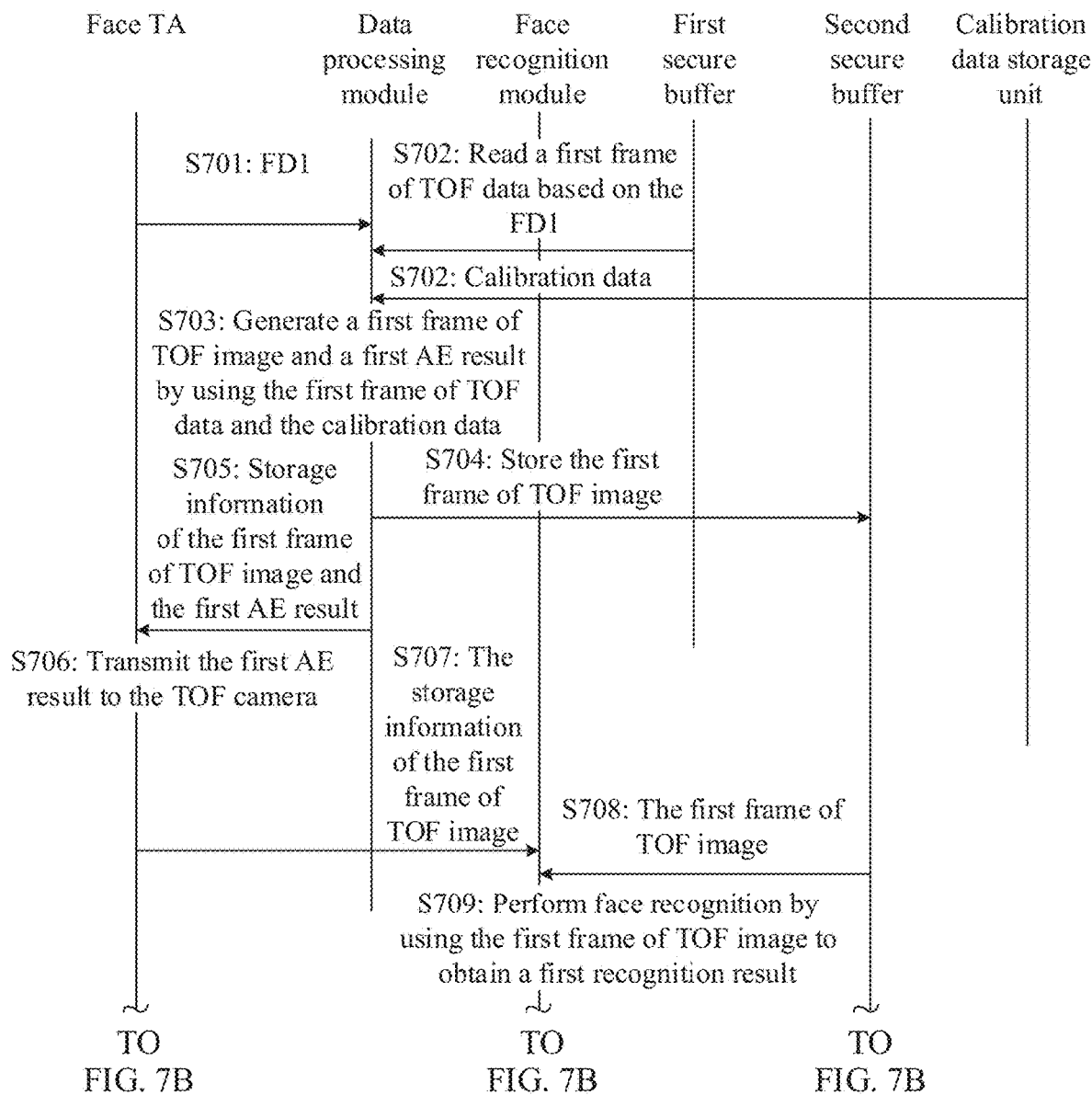
FIG. 7A-FIG. 7B are a flowchart of a data processing method according to an embodiment of this application.
Figure 7B:
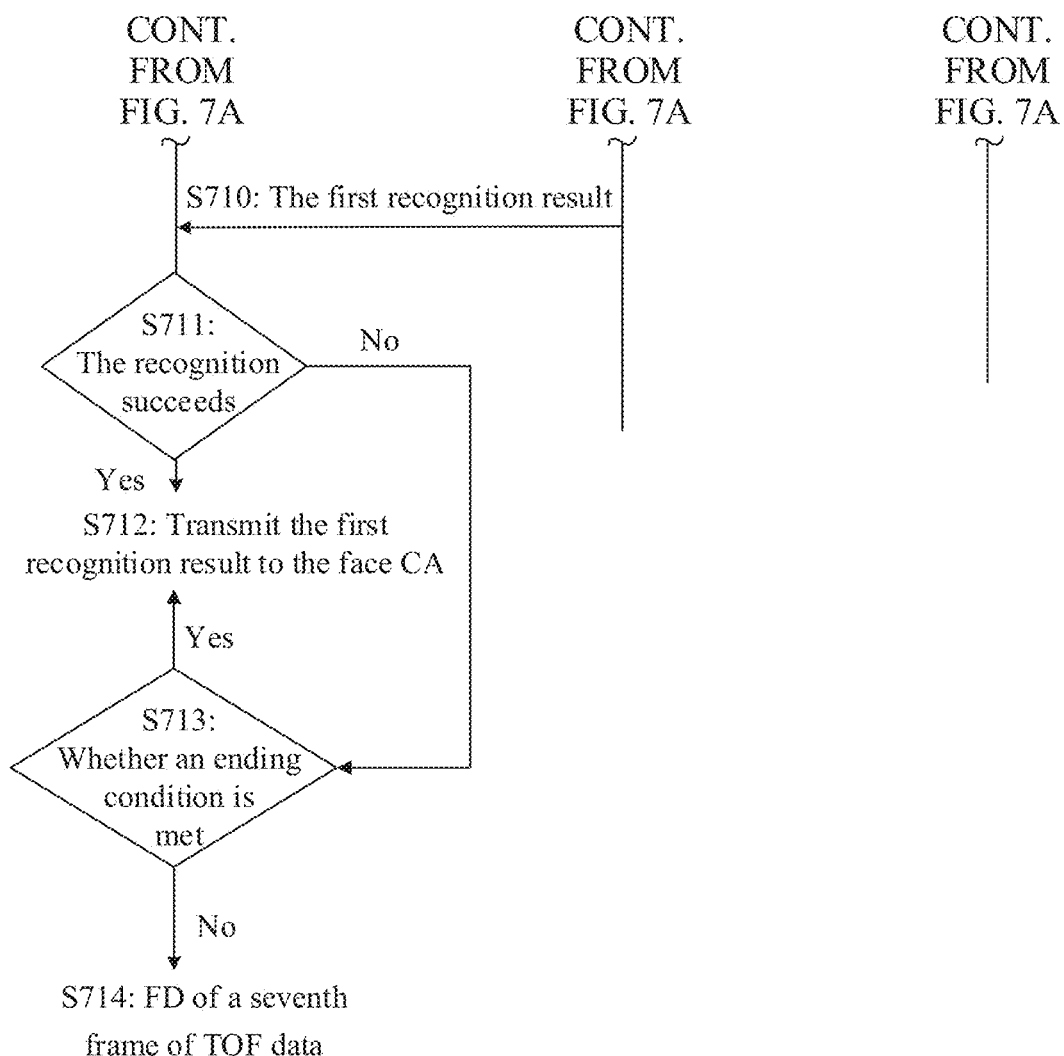

FIG. 7A-FIG. 7B show a data processing method according to an embodiment of this application. Compared with FIG. 4A-FIG. 4B, FIG. 5A-FIG. 5C, or FIG. 6A-FIG. 6C, the improvement lies in applications and modules in the TEE, and the functions and data transmission modes of modules in the REE are the same as those in FIG. 4A-FIG. 4B, FIG. 5A-FIG. 5C, or FIG. 6A-FIG. 6C. Details are not described herein again. As shown in FIG. 7A-FIG. 7B, a procedure, starting after the face TA receives an FD1 and calibration data, includes the following steps:

S701: The face TA receives an FD of a first frame of TOF data (referred to as FD1), and then transmits the FD1 to the data processing module.

In some implementations, the first frame of TOF data is the first frame of TOF data collected by the TOF camera after the TOF camera is driven by the TOF camera driver that is controlled by the camera HAL3 in response to an image request.

In some other implementations, TOF data frames collected by the TOF camera are identified as security indicator frames and face recognition frames. The security indicator frames carry eye safety flags used to indicate whether infrared light emitted by the TOF camera is safe for human eyes. The face recognition frames are TOF data frames used for face recognition. In this case, the first frame of TOF data in this step is a first face recognition frame.

S702: The data processing module reads the first frame of TOF data from a first Secure Buffer based on the FD1, and reads calibration data from the calibration data storage unit.

In this embodiment, it is assumed that the calibration data has been stored in the calibration data storage unit.

S703: The data processing module generates a TOF image by using the first frame of TOF data and the calibration data, and generates an automatic exposure (AE) result.

As described above, the TOF image includes a depth image and an infrared image.

The AE result is used for the TOF camera to adjust exposure parameters of collected TOF data. The AE result includes, but is not limited to, exposure time and physical gain of the TOF sensor. A method for generating an AE result includes: extracting a face area from a TOF original image (Raw Data), calculating a brightness value of the face area, and comparing the brightness value with a pre-configured target brightness value to obtain exposure time and physical gain of the TOF sensor.

To facilitate the description, the TOF image obtained by processing the first frame of TOF data is referred to as a first frame of TOF image. The AE result obtained from the first frame of TOF data is referred to as a first AE result.

S704: The data processing module stores the first frame of TOF image in a second secure buffer.

S705: The data processing module transmits storage information of the first frame of TOF image and the first AE result to the face TA.

It may be understood that, because the storage information of the first frame of TOF image is only transmitted in the TEE, the storage information may be transmitted in plain text.

S706: The face TA transmits the first AE result to the TOF camera.

With reference to the example shown in FIG. 4A-FIG. 4B, FIG. 5A-FIG. 5C, or FIG. 6A-FIG. 6C, paths for transmitting the first AE result to the TOF camera include: the face TA, the face CA, the camera service, the camera HAL3, and the TOF sensor controller of the TOF camera. The TOF sensor controller then uses the first AE result to adjust parameters of the TOF camera, including but not limited to exposure time.

It may be understood that TOF data frames for which the first AE result can be used are associated with the time for the processor to process TOF data. For example, the TOF camera collects data at an interval of 30 ms, assuming that the processor also takes 30 ms to generate a first TOF image and a first AE result in total, the first AE result can be first used for a third frame of TOF data collected by the TOF camera.

The generating and transmitting the AE result is an optional step. The purpose is to improve the quality of TOF data collected subsequently, so as to obtain better TOF images and more accurate recognition results.

The first frame of TOF data may be collected by using pre-configured fixed exposure parameters.

S707: The face TA transmits the storage information of the first frame of TOF image to the face recognition module to trigger the face recognition module to perform face recognition.

It may be understood that execution sequence of S706 and S707 is not limited.

S708: The face recognition module reads the first frame of TOF image from the second secure buffer by using the storage information of the first frame of TOF image.

S709: The face recognition module performs face recognition by using the first frame of TOF image to obtain a first recognition result.

With reference to FIG. 3, the face recognition module calls face templates to perform face comparison on the first frame of TOF image. In addition to face comparison, depth images and infrared images may also be used for anti-spoofing recognition. Therefore, face recognition includes face comparison and anti-spoofing recognition. If both face comparison and anti-spoofing recognition succeed, the recognition result indicates that the face recognition succeeds.

S710: The face recognition module transmits the first recognition result to the face TA.

S711: The face TA determines whether the first recognition result indicates that the recognition succeeds; and S712 is performed if the first recognition result indicates that the recognition succeeds, or S713 is performed if the first recognition result does not indicate that the recognition succeeds.

S712: The face TA transmits the first recognition result to the face CA.

As described above, the face CA transmits the first recognition result to a task initiator, such as an unlock application.

S713: The face TA determines whether an ending condition is met; and S712 is performed if the ending condition is met, or S714 is performed if the ending condition is not met.

The ending condition may be set in advance. In this step, the ending condition includes: the time for executing the task reaches a second time threshold. For example, the second time threshold is 5 seconds. The ending condition is optional. Alternatively, it is not necessary to determine whether the ending condition is met. If the first recognition result indicates that the recognition fails, S714 is performed.

It can be learned that the purpose of setting the ending condition is to avoid unnecessary time consumption during task execution: if the face recognition still fails after a period of time, it may be basically determined that the face recognition result is determined to be unacceptable. For example, a face attempting to unlock is not stored in the electronic device in advance. Therefore, it is unnecessary to continue the face recognition. Instead, the face recognition results should be fed back to the task as soon as possible to reduce delay of task execution, so as to ensure a better user experience.

S714: The face TA receives a frame of TOF data from the TOF camera again.

For example, the TOF camera collects data at an interval of 30 ms, and it takes 30 ms to generate a first frame of TOF image and a first AE result. In this case, a frame of TOF data received again from the TOF camera again is a seventh frame of TOF data collected by the TOF camera.

It may be understood that, because the first AE may be first used for the third frame of TOF data, the seventh frame of TOF data is a TOF data frame collected after exposure parameters are adjusted based on the first AE result.

After a TOF data frame is received again, for a subsequent procedure to be executed by the face TA, reference may be made to S701-S714; that is, the first frame of TOF data as a processing object in S701-S714 is replaced by a frame of TOF data received again, such as the seventh frame of TOF data, and a processing result of the first frame of TOF data is adaptively replaced by a processing result of the frame of TOF data received again (for example, a first frame of TOF image is replaced by a second frame of TOF image). Details are not described herein again.

Compared with an existing face recognition procedure, the procedure shown in FIG. 7A-FIG. 7B has at least the following differences: an image data processing procedure in the conventional technology includes a step of iterating image data to acquire convergent image data, so as to obtain images with quality meeting the requirements of recognition accuracy.

Using RGB data as an example, because RGB data may be easily affected by ambient light, the quality of the first frame of RGB data collected usually cannot meet the requirements of recognition accuracy. Therefore, it is necessary to iterate the RGB data to obtain convergent RGB data, and then the convergent RGB data is used to perform face recognition to ensure the accuracy of a recognition result. Generally, based on different iterative algorithms, RGB data can converge in about 10 frames at a fast rate, and in 30-40 frames at a slow rate. Therefore, persons skilled in the art have a consensus that the quality of the first frame of RGB data is likely to be poor due to the influence of ambient light, and it is meaningless to use the first frame of RGB data directly for face recognition.

In this embodiment, based on the foregoing TOF imaging principle (1), the first frame of TOF data converges in most scenarios. Therefore, it can be learned that a more accurate recognition result may be probably obtained from the first frame of TOF data. Therefore, after the first frame of TOF data is collected by the electronic device, the first frame of TOF image generated from the first frame of TOF data is used to obtain a face recognition result. Therefore, lower processing delay can be obtained while ensuring the high accuracy of the recognition result. That is, based on the foregoing TOF imaging principle, the step of iterating image data to obtain convergent image data is omitted for increasing an image data processing speed.

Further, the inventors have found in the research that the interval at which the TOF camera collects TOF data and the time for a processor to generate a TOF image are usually 30 ms, and the time for face recognition is usually 150 ms. Therefore, the time for obtaining a recognition result by using TOF data is 30 ms+150 ms=180 ms. When other conditions are the same, this value can show that the method according to this embodiment enables a user to obviously feel a higher unlock speed, so that user experience can be improved.

Because a frame of TOF data received again is collected by using exposure parameters determined based on the first AE result, the probability of convergence is higher. Therefore, even if the first frame of TOF data fails to be recognized due to quality problems, the frame of TOF data received again can be recognized successfully, and the time spent is: (30 ms+150 ms) *2=360 ms, which is still superior to the convergence time of RGB data.

A more specific scenario example applied in this embodiment is as follows:

Due to hardware conditions of a mobile phone, only one processor (such as the secure enclave processor 21 shown in FIG. 2) can be configured to implement face recognition.

Assuming that a face attempting to unlock is a face already recorded in the electronic device, after the user points the face at a screen of the mobile phone, the TOF camera collects TOF data at an interval of 30 ms, and transmits the TOF data to the processor. After receiving a first frame of TOF data, the processor processes the first frame of TOF data into a first frame of depth image and a first frame of infrared image based on the procedure described in this embodiment, and uses the first frame of depth image and the first frame of infrared image to obtain a first recognition result. In a process of generating the first frame of TOF image and calculating a recognition result by the processor, although the TOF camera is still transmitting TOF data frames to the processor, because the processor is being occupied, the processor can no longer receive subsequent TOF data frames, that is, other TOF data frames are discarded except the first frame of TOF data received.

It can be learned that the procedure of a TOF data iteration process is not considered in this embodiment, which can exactly fit the foregoing scenario of one processor. That is, in a scenario where only one processor is used for TOF data processing and face recognition, if recognition processing is to be implemented and iteration of TOF data is to be performed to wait for convergence of the TOF data, these operations need to be processed serially by the processor, and therefore, it takes too much time. However, the method according to this embodiment can shorten the time because iteration is not performed on TOF data. In addition, because TOF data converges in the first frame in most cases, the method can also ensure the accuracy of recognition results while shortening the time for face recognition.

In conclusion, the data processing method according to this embodiment, based on the characteristic that TOF data probably converges in the first frame, ensures that face recognition can be performed accurately and quickly in most cases, and because TOF data is used for face recognition with high security, the data processing method can achieve the purpose of implementing face recognition safely, accurately, and quickly.

The inventors have further found in the research that in an outdoor scenario, because there is also light in the natural light with a wavelength close to that of infrared light emitted by the TOF light source, the first frame of TOF data collected may be overexposed. In this case, the quality of the first frame of TOF data is insufficient to obtain an accurate recognition result. As in the previous example, when unlock from the first frame fails, the unlock delay required is at least 360 ms, and there is still room for further shortening the delay.

Figure 8A:
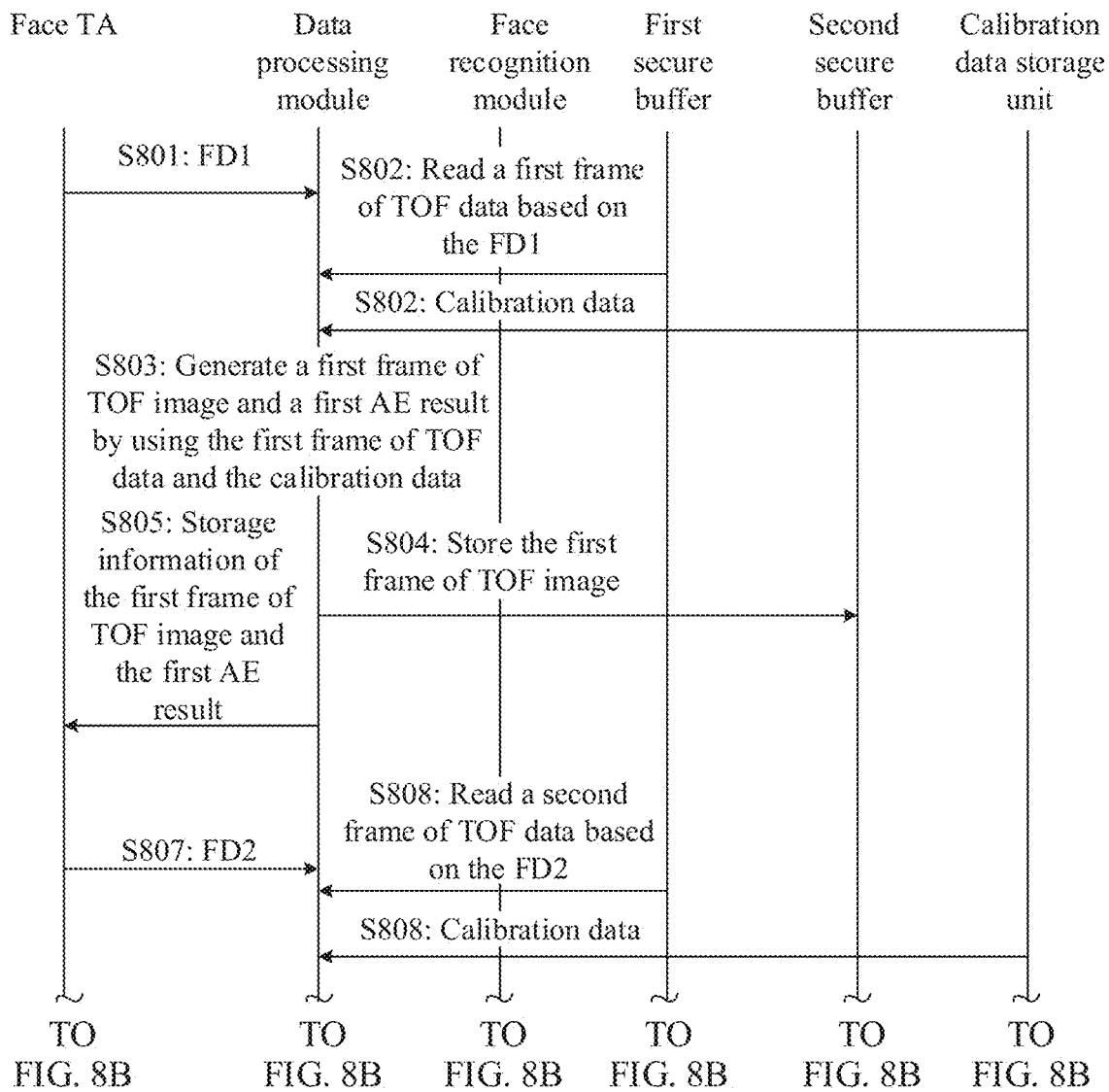
FIG. 8A-FIG. 8B are a flowchart of another data processing method according to an embodiment of this application.
Figure 8B:
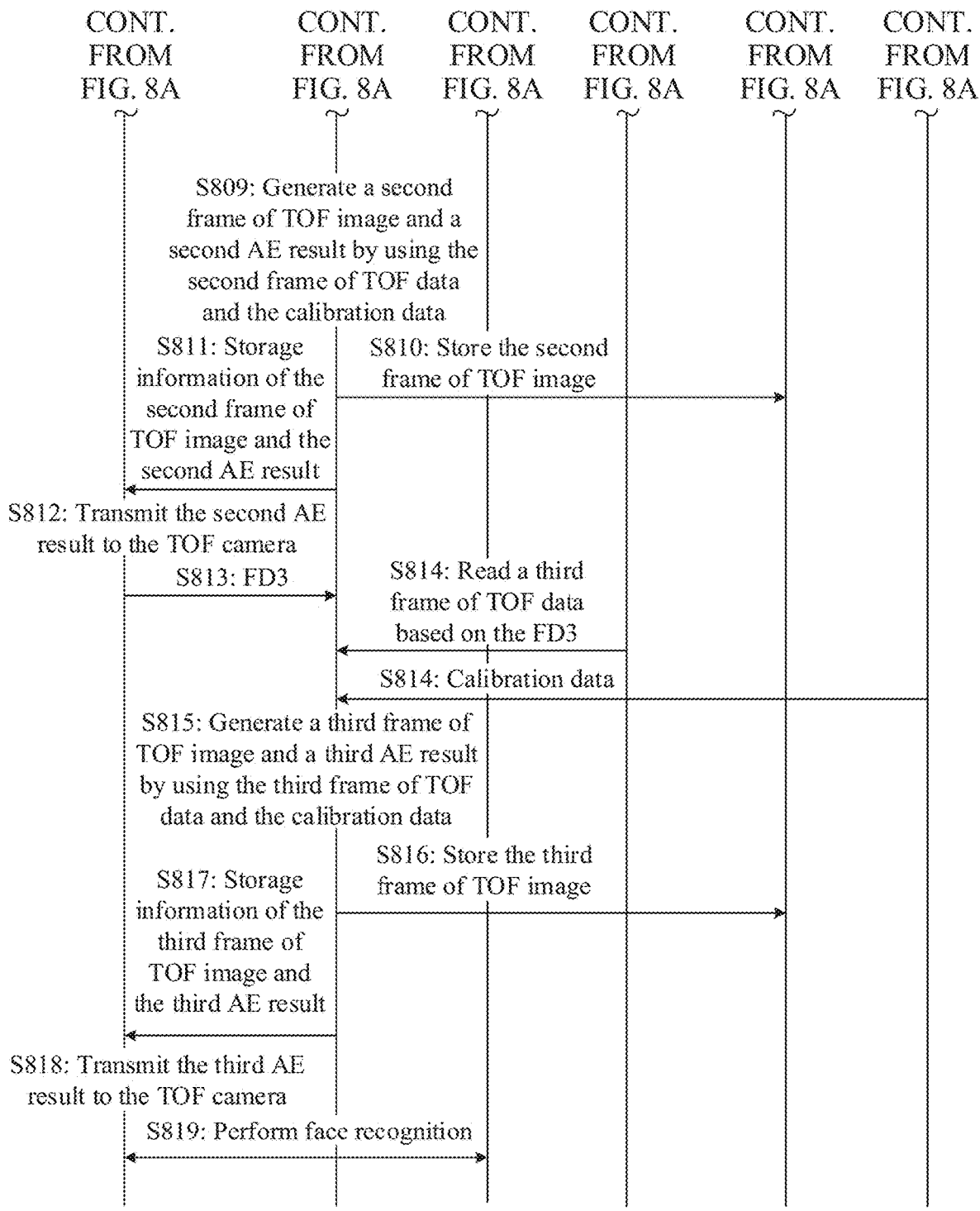

FIG. 8A-FIG. 8B show another data processing method according to an embodiment of this application.

S801-S806 are the same as S701-S706. Refer to FIG. 8 for details, and details are not described herein again.

S807-S812 show a processing procedure for a second frame of TOF data after storage information of the second frame of TOF data is received. The processing procedure for the second frame of TOF data is the same as the processing procedure for the first frame of TOF data. Refer to FIG. 8A-FIG. 8B for details, and details are not described herein again.

It may be understood that the second frame of TOF data may be a TOF data frame collected by the TOF camera using exposure parameters adjusted based on the first AE result, or may be the same as exposure parameters of the first frame of TOF data, depending on the interval at which the TOF camera collects TOF data frames (such as the foregoing first time interval) and the time taken by the processor from receiving a TOF data frame to feeding back an AE result.

Assuming that the TOF camera collects and transmits data at an interval of 30 ms, and the processor also takes 30 ms to process TOF data into a TOF image and obtain an AE result, the first AE result cannot be used to collect the second frame of TOF data.

S813-S818 show a processing procedure for a third frame of TOF data after storage information of the third frame of TOF data is received. The processing procedure for the third frame of TOF data is the same as the processing procedure for the first frame of TOF data. Refer to FIG. 8A-FIG. 8B for details, and details are not described herein again.

It can be learned from the foregoing procedure that this embodiment differs from the foregoing embodiment in that the first three frames of TOF data are received and processed.

S819: The face TA calls a face recognition module for face recognition.

Figure 9:
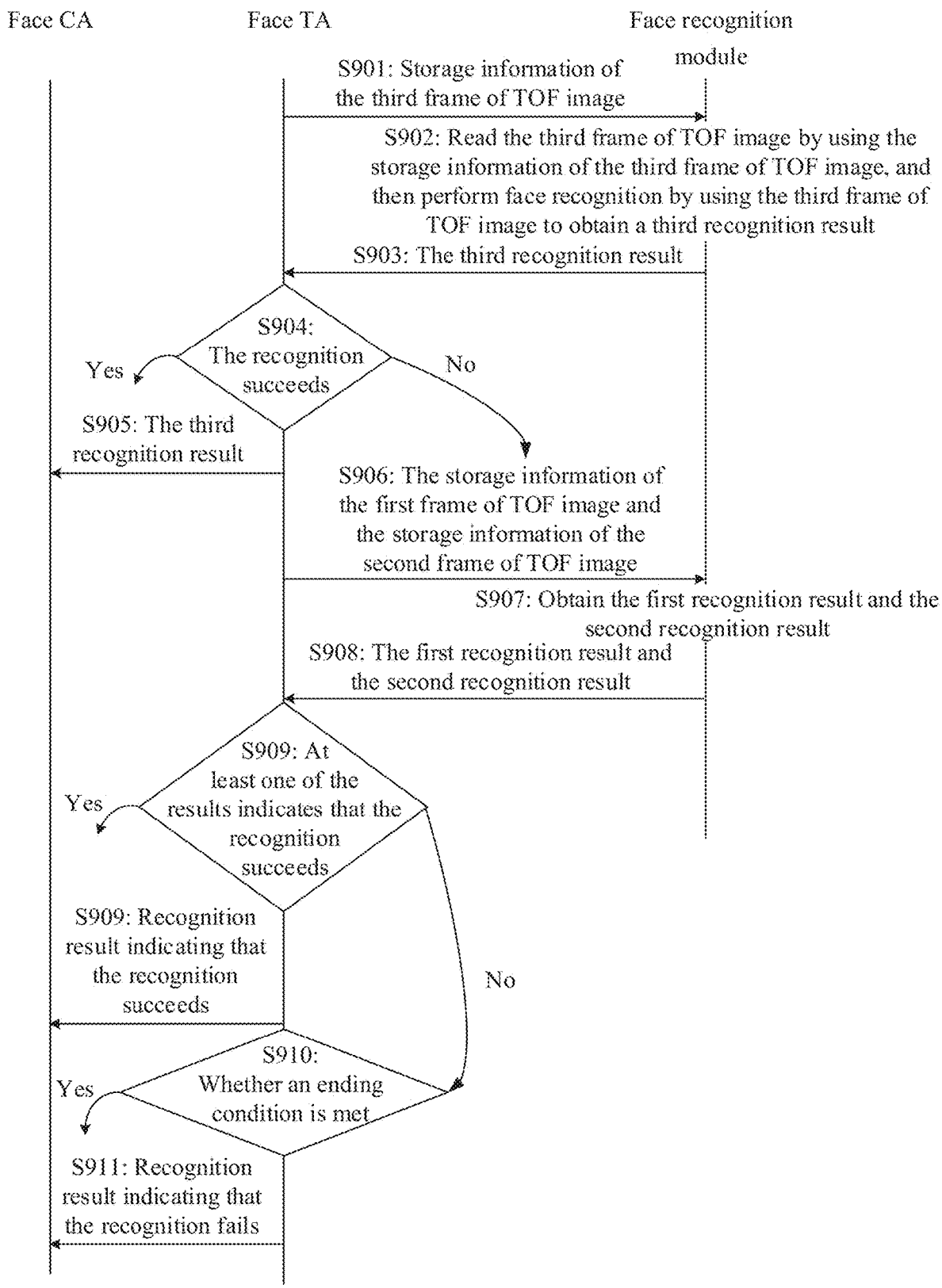
FIG. 9 is a flowchart showing specific implementation of S819 in FIG. 8A-FIG. 8B.

An optional implementation of 5819 is shown in FIG. 9:

s901: The face TA transmits storage information of a third frame of TOF image to the face recognition module.

S902: The face recognition module reads the third frame of TOF image by using the storage information of the third frame of TOF image, and then performs face recognition by using the third frame of TOF image to obtain a recognition result for the third frame of TOF image.

It may be understood that the face recognition module reads the third frame of TOF image from the second secure buffer, which is not described in detail in FIG. 9.

To facilitate the distinction, the recognition result of the third frame of image is referred to as a third recognition result.

S903: The face recognition module transmits the third recognition result to the face TA.

S904: The face TA determines whether the third recognition result indicates that the recognition succeeds; and S905 is performed if the third recognition result indicates that the recognition succeeds, or S906 is performed if the third recognition result does not indicate that the recognition succeeds.

S905: The face TA transmits the third recognition result to the face CA.

Because the third frame of TOF data is most likely to be the data collected after exposure parameters are adjusted based on an AE result, the quality is most likely to be optimal. Therefore, the time consumed can be further shortened by first using the third frame of TOF image for face recognition.

S906: The face TA transmits the storage information of the first frame of TOF image and the storage information of the second frame of TOF image to the face recognition module.

S907: The face recognition module obtains the first recognition result and the second recognition result.

The first recognition result is a result of face recognition performed by using the first frame of TOF image. The second recognition result is a result of face recognition performed by using the second frame of TOF image.

It may be understood that the sequence of using the first frame of TOF image and the second frame of TOF image for face recognition is not limited.

S908: The face recognition module transmits the first recognition result and the second recognition result to the face TA.

S909: If at least one of the first recognition result and the second recognition result indicates that the recognition succeeds, the face TA transmits the recognition result indicating that the recognition succeeds to the TOF CA.

S910: If both the first recognition result and the second recognition result indicate that the recognition fails, the face TA determines whether an ending condition is met; and S911 is performed if the ending condition is met, or the procedure shown in FIG. 8A-FIG. 8B is executed again if the ending condition is not met.

For the definition of the ending condition, refer to the foregoing embodiments. In this step, the time threshold in the ending condition may be shorter than that in the foregoing embodiments, because in this embodiment, a plurality of frames of TOF data have been collected and processed. In this step, an example of the time threshold is 3 seconds.

It should be noted that when the procedure shown in FIG. 8A-FIG. 8B is executed again, for "an Nth frame of TOF data", N is no longer a sequence of data frames collected by the TOF camera, N=1,2,3, which refers to an order of TOF data frames received by the processor when the procedure shown in FIG. 8A-FIG. 8B is executed this time. For example, when S801 is performed again, the TOF camera may collect the ninth frame of TOF data, but when the procedure shown in FIG. 8A-FIG. 8B is executed this time, the processor receives the first frame of TOF data. Therefore, "the first frame of TOF data" in S801 is the first frame of TOF data in the procedure shown in FIG. 8A-FIG. 8B executed this time, rather than the first frame of TOF data actually collected by the TOF camera.

S911: The face TA transmits the recognition result indicating that the recognition fails to the TOF CA.

It may be understood that 5819 may be implemented in other ways in addition to that shown in FIG. 9, for example, the first frame of TOF image, the second frame of TOF image, and the third frame of TOF image are successively used for face recognition, or only the third frame of TOF image is used for recognition. If the recognition result indicates that the recognition fails, the procedure shown in FIG. 8A-FIG. 8B is executed again to save resources such as memory. Other implementations are not listed herein. By using the method according to this embodiment, based on the foregoing TOF imaging principle (2), TOF data converges in 2-3 frames, three frames of TOF data are processed successively to obtain a recognition result. For an outdoor scenario, the processing delay can be lower than that in the foregoing embodiments.

An example of an application scenario of the procedure shown in FIG. 8A-FIG. 8B is as follows:

Assuming that a face attempting to unlock is a face already recorded in the electronic device, the user points the face at a screen in an outdoor environment, and then the TOF camera collects TOF data at an interval of 30 ms and transmits the TOF data to the processor. After receiving a first frame of TOF data, the processor processes the received TOF data to generate a first TOF image and a first AE result.

Because the electronic device is in an outdoor environment, the electronic device will probably not be unlocked by the first frame of TOF data. Therefore, after generating the first TOF image and transmitting the first AE result, the processor will not perform face recognition, but continue to receive and process TOF data frames. The time required to generate a TOF image and an AE result is 30 ms, which is equivalent to the time required for the TOF camera to collect and transmit TOF data. Therefore, after the first frame of TOF data is processed, a second frame of TOF data may be received and processed, and after the second frame of TOF data is processed, a third frame of TOF data may be received and processed.

Based on the foregoing time, the first AE result generated from the first frame of TOF data can be first used for the third frame of TOF data. Therefore, the third frame of TOF data will probably unlock successfully.

The shortest time consumed to obtain a recognition result from the third frame of TOF data is 30 ms*3+150 ms. Compared with the foregoing embodiments, when unlock from the first frame of TOF data fails, the speed can be improved and delay can be shortened by unlocking from the third frame instead of unlocking from the seventh frame.

It can be learned that if unlock from the first frame of TOF data succeeds, the time for processing (generating a TOF image and an AE result) two TOF data is increased by 60 ms compared with the foregoing embodiments. Therefore, the data processing method according to this embodiment can increase the unlocking speed in outdoor bright light scenarios by sacrificing the unlocking speed of the first frame of TOF data.

It may be understood that, because the first AE result is used for the third frame of TOF data, optionally, in FIG. 8A-FIG. 8B, the second frame of TOF data and the AE result of the second frame of TOF data may not be processed, that is, S807-S812 are not performed, so as to save resources. Correspondingly, the recognition result is obtained without the participation of the second frame of TOF image.

In conclusion, the second frame of TOF data may only be received without being processed. Alternatively, the second frame of TOF data may be discarded instead of being received.

In this embodiment, for example, three frames of TOF data are successively processed in a procedure, in fact, a quantity of successively processed TOF data frames is associated with the time taken to generate and feed back an AE result, and the first time interval for the TOF camera to collect data frames.

Based on respective applicable scenarios of the foregoing embodiments, it may be understood that the method described in FIG. 7A-FIG. 7B or FIG. 8A-FIG. 8B may be used preferentially based on judging conditions. Based on the software framework shown in FIG. 3, another data processing method according to an embodiment of this application includes the following steps:

1. The face CA acquires an intensity value of ambient light.

Based on the software framework shown in FIG. 3, after receiving a task request, the face CA may also send a light intensity request to obtain an intensity value of ambient light. It may be understood that a light intensity request may be sent to a corresponding driver at the kernel layer through the application framework layer and a corresponding module at the hardware abstraction layer, and the corresponding driver at the kernel layer drives the light sensor to sense an intensity value of ambient light and feed back the intensity value to the face CA.

2. The face CA transmits the intensity value of ambient light to the face TA.

3. The face TA determines whether the intensity value of ambient light is greater than a preset first intensity threshold; and the data processing procedure shown in FIG. 7A-FIG. 7B is executed if the intensity value of ambient light is greater than the preset first intensity threshold, or the data processing procedure shown in FIG. 8A-FIG. 8B is executed if the intensity value of ambient light is not greater than the preset first intensity threshold.

In this embodiment, the intensity value of light is used to determine an environment in which the electronic device is located, and a procedure more suitable for the environment is used to obtain a face recognition result. Therefore, on the basis of improving the security, the accuracy and speed of obtaining the face recognition result can be improved to the greatest extent.

The inventors have further found in the research that, in both outdoor and indoor scenarios, the quality of the first frame of TOF data cannot support an accurate face recognition result when ambient light is extremely intense and the sensor of the TOF camera is exposed to an intense light source. Therefore, it is necessary to converge TOF data, so as to increase the time for face recognition.

Figure 1B:
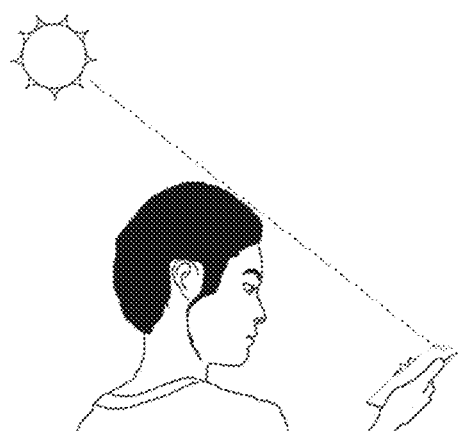
FIG. 1B is a diagram of an example of a scenario in which an electronic device is used for face recognition in bright light.

For example, in FIG. 1B, a user is located outdoors in intense sunlight and faces away from the sun. In this case, the user points a front camera of a mobile phone at the face, expecting to unlock with the face (assuming that the face of the user has been stored in the mobile phone as a face module), which takes more time to unlock than in an indoor environment.

To resolve the foregoing problem, an embodiment of this application provides a data acquisition method, to acquire a first frame of TOF data with higher quality, so as to improve the accuracy of a recognition result of the first frame of TOF data while using TOF data for face recognition to achieve higher security, and further achieve the purpose of completing face recognition quickly.

Figure 10:
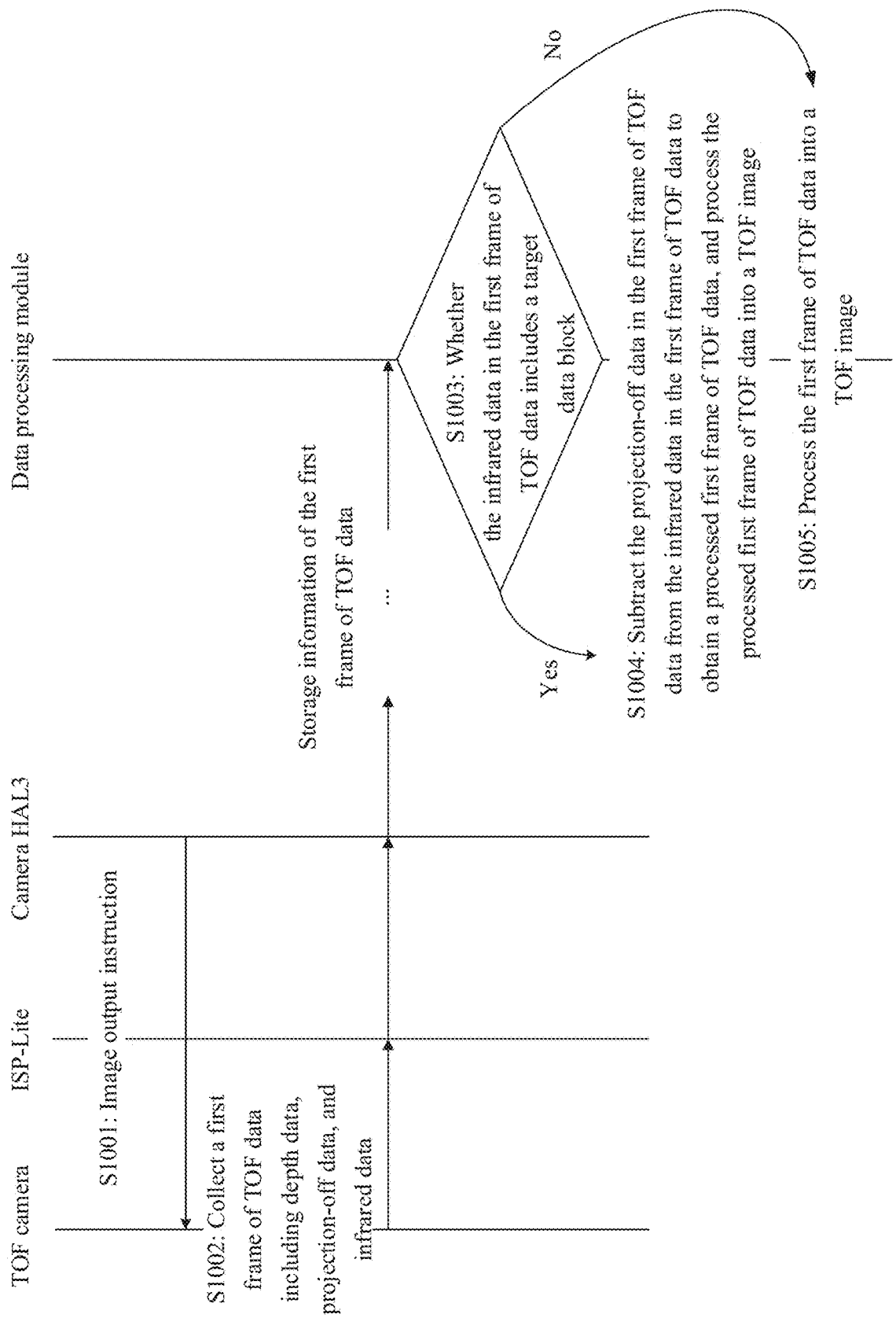
FIG. 10 is a flowchart of a data acquisition method according to an embodiment of this application.

FIG. 10 shows a data acquisition method according to an embodiment of this application. The data acquisition method is performed by the foregoing electronic device. With reference to FIG. 2 to FIG. 6A-FIG. 6C, the procedure shown in FIG. 10 starts from driving, by the camera HAL3, the TOF camera through the TOF camera driver to collect data. The data acquisition method includes the following steps:

S1001: The camera HAL3 transmits an image output instruction to the TOF camera in response to an image request.

With reference to FIG. 2 and FIG. 3, it may be understood that the camera HAL3 may transmit the image output instruction to the TOF camera through the TOF camera driver at the kernel layer.

S1002: The TOF camera collects a first frame of TOF data including depth data, projection-off data, and infrared data in response to the image output instruction.

The depth data is data used to generate a depth image. The projection-off data is TOF data collected by the TOF camera when the TOF light source is turned off. The infrared data is data used to generate an infrared image.

The depth data and the infrared data are TOF data collected by the TOF camera when the TOF light source is turned on.

When the TOF camera is (powered on) started, the TOF light source is turned on by default. In some implementations, the TOF sensor controller of the TOF camera transmits an image output instruction to the TOF sensor, and the TOF sensor, in response to the image output instruction, collects depth data and transmits a turn-off instruction to the TOF light source controller. The TOF light source controller turns off the TOF light source in response to the turn-off instruction, and the TOF sensor collects projection-off data. The TOF sensor transmits a turn-on instruction to the TOF light source controller, the TOF light source controller turns on the TOF light source in response to the turn-on instruction, and then the TOF sensor collects infrared data.

In some implementations, an example of the first frame of TOF data is: 4 sets of depth data, one set of projection-off data, and one set of infrared data. "One set of data" may be construed as a two-dimensional array.

The TOF sensor collects sets of depth data successively in a first exposure time, and then collects infrared data in a second exposure time, and collects projection-off data in the first exposure time or the second exposure time. The first exposure time and the second exposure time may be carried by the camera HAL3 in the image output instruction or transmitted to the TOF camera separately, may be transmitted to the TOF camera by another module, or may be acquired from a storage module by the TOF camera in advance.

It may be understood that the timing when the TOF sensor sends a turn-off instruction to the TOF light source controller is associated with the first exposure time, and the timing when the TOF sensor sends a turn-on instruction to the TOF light source controller is associated with an exposure time of projection-off data.

In some implementations, the TOF sensor may mark TOF data collected in a first time range as projection-off data. The first time range may be determined based on an interval between the time when the TOF sensor sends a turn-off instruction and the time when the TOF sensor sends a turn-on instruction. The TOF sensor may mark TOF data collected before the first time range as depth data, and mark TOF data collected after the first time range as infrared data.

It may be understood that a sequence in which the TOF camera collects depth data, projection-off data, and infrared data is not limited. For example, these data may be collected in a sequence of projection-off data, infrared data, and depth data, or may be collected in a sequence of infrared data, depth data, and projection-off data. The timing when the TOF sensor transmits a turn-off instruction and a turn-on instruction to the TOF light source controller is adjusted based on the sequence.

In this step, a higher execution speed is achieved by using the TOF sensor to control the TOF light source to turn on or off.

S1003: The data processing module acquires the first frame of TOF data, and then determines whether the infrared data in the first frame of TOF data includes a target data block; and S1004 is performed if the infrared data includes the target data block, or S1005 is performed if the infrared data does not include the target data block.

A specific manner in which the data processing module acquires the first frame of TOF data is as shown in FIG. 4A-FIG. 4B, FIG. 5A-FIG. 5C, or FIG. 6A-FIG. 6C. Details are not described herein again.

The infrared data is a two-dimensional array. It may be understood that the two-dimensional array includes some numerical values arranged in rows and columns, and each numerical value may be regarded as a data point. The target data block is a data block that meets the following preset condition: a quantity of data points with numerical values greater than a first threshold is greater than a second threshold.

As described above, the infrared data collected by the TOF sensor is a two-dimensional array, which is processed by the ISP-Lite into infrared raw data, that is, an infrared raw image. Therefore, it may be understood that the target data block is a target area in the infrared raw image, and each numerical value in the target data block is a brightness value of a corresponding pixel in the target area. Therefore, for the infrared raw image, the target area is an area in which a quantity of pixels with brightness values greater than a first threshold is greater than a second threshold.

When ambient light is extremely intense and the TOF camera is exposed to an intense light source, TOF data collected by the TOF camera is usually overexposed due to the intense light. Therefore, the brightness of most pixel values in an overexposed area of the infrared raw image generated from the TOF data is too high, which will affect recognition. Conditions of the target area (data block) in this step are set based on this principle.

S1004: Subtract the projection-off data in the first frame of TOF data from the infrared data in the first frame of TOF data to obtain a processed first frame of TOF data, and process the processed first frame of TOF data into a TOF image.

S1005: Process the first frame of TOF data into a TOF image.

It may be understood that, that the processing the first frame of TOF data into a TOF image means processing the depth data in the first frame of TOF data into a depth image and processing the infrared data in the first frame of TOF data into an infrared image.

According to the method described in this embodiment, when the infrared data in the first frame of TOF data is overexposed, the impact of ambient light on the infrared data is removed by subtracting the projection-off data from the infrared data in the first frame of TOF data, so as to improve the quality of the first frame of TOF data, and further obtain a high-quality TOF image, which improves the accuracy and speed of face recognition.

Figure 11:
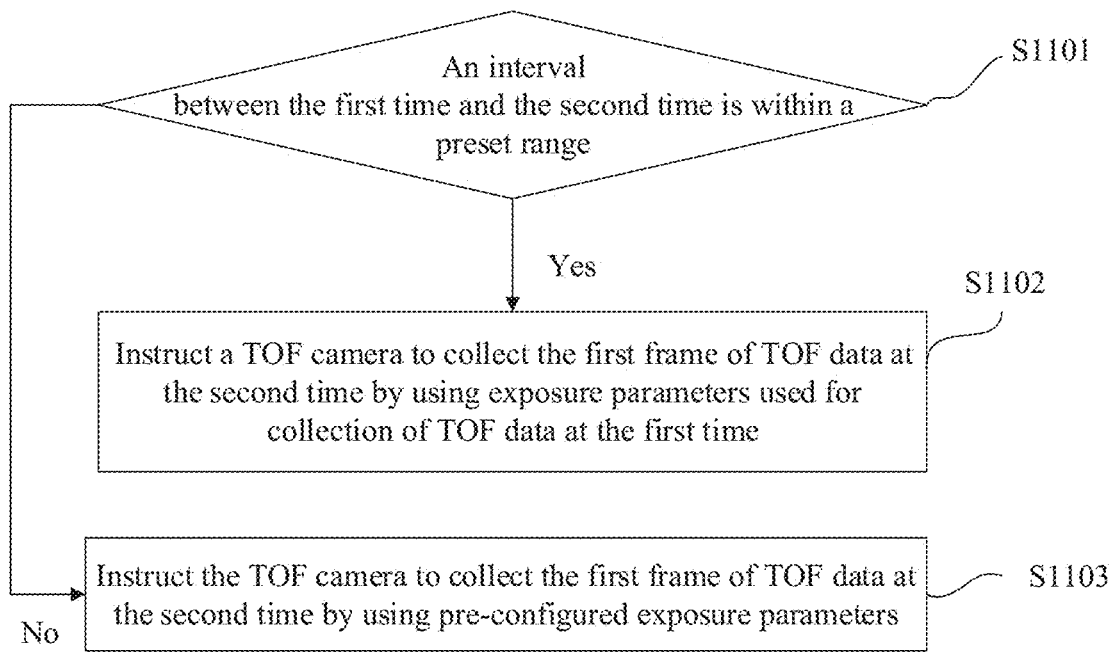
FIG. 11 is a flowchart of another data acquisition method according to an embodiment of this application.

FIG. 11 shows another data acquisition method according to an embodiment of this application. The data acquisition method is performed by the camera HAL3 shown in FIG. 3, and includes the following steps:

S1101: In response to an image request, determine whether an interval is within a preset range; and S1102 is performed if the interval is within the preset range, or S1103 is performed if the interval is not within the preset range.

The interval is an interval between the time when TOF data is collected last time (referred to as a first time) and the time when the first frame of TOF data is to be collected (referred to as a second time).

It may be understood that, because the camera HAL3 drives the TOF camera to collect TOF data through the TOF camera driver at the kernel layer, the camera HAL3 may select the second time based on the time when an image output instruction is sent to the TOF camera driver. For example, the time when the image output instruction is sent to the TOF camera driver is added with a certain delay, and then is used as the second time. For another example, to simplify the procedure, the camera HAL3 may directly take the current time of the system as the second time.

In this embodiment, the first frame of TOF data is a first frame of TOF data collected by the TOF camera triggered by a task request from an application, as shown in FIG. 4A-FIG. 4B, FIG. 5A-FIG. 5C, or FIG. 6A-FIG. 6C. The last time may be the last frame of TOF data collected by the TOF camera triggered by the last task request.

S1102: Instruct the TOF camera to collect the first frame of TOF data at the second time by using exposure parameters used for collection of TOF data last time.

As described above, because AE results may be used to adjust parameters of the TOF camera, the exposure parameters used for collection of TOF data last time are likely to be adjusted exposure parameters, and because the interval between the first time and the second time is within the preset range, the electronic device is likely to be in the same environment as the last collection. Therefore, the exposure parameters used for collection of TOF data last time are likely to be applicable to the current environment, which helps obtain high-quality TOF data, and therefore helps obtain a high-quality TOF image.

S1103: Instruct the TOF camera to collect the first frame of TOF data by using pre-configured exposure parameters.

If the interval between the first time and the second time is long, it indicates that a long time has elapsed since the collection of TOF data last time, and it is likely that the environment in which the electronic device is located has changed. Therefore, the exposure parameters used for collection of TOF data last time are no longer applicable to the current environment, and it is not meaningful to use the exposure parameters used for collection of TOF data last time. Therefore, pre-configured exposure parameters are used.

The data acquisition method according to this embodiment makes full use of exposure parameters adjusted based on an AE adjustment mechanism, so as to improve the quality of the first frame of TOF data, and further obtain a high-quality TOF image, which improves the accuracy and speed of face recognition.

It may be understood that, in the foregoing step, the exposure parameters used for collection of TOF data last time are only one implementation. Because the time for collection of TOF data last time is the latest time from the second time, the purpose of comparison with the collection of TOF data last time is to save computing resources.

However, in this embodiment, any collection before the second time may be compared with the second time, but not limited to the comparison with the collection of TOF data last time. Therefore, the conditions met by the first time may be summarized as follows: The first time is earlier than the second time, and the interval between the first time and the second time is within the preset range.

Figure 12:
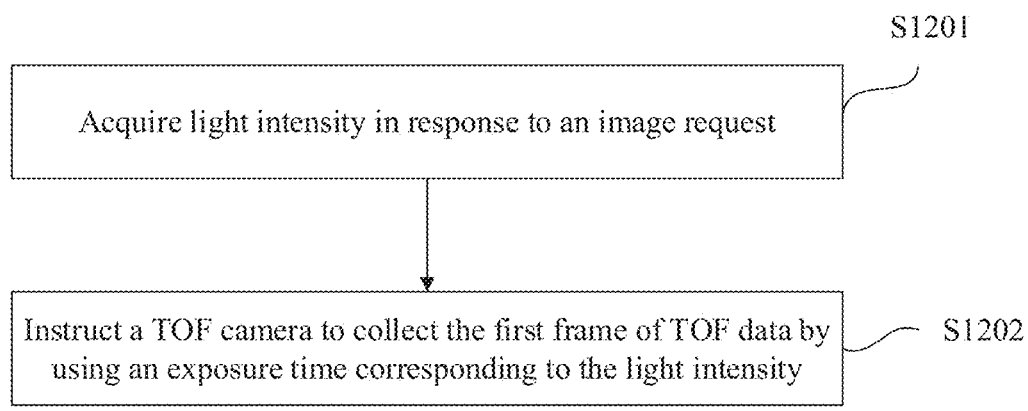
FIG. 12 is a flowchart of another data acquisition method according to an embodiment of this application.

FIG. 12 shows another data acquisition method according to an embodiment of this application. The data acquisition method is performed by the camera HAL3 shown in FIG. 3, and includes the following steps:

S1201: Acquire light intensity in response to an image request.

In this step, an ambient light sensor on the electronic device may be used to acquire light intensity of an environment in which the electronic device is located.

S1202: Instruct the TOF camera to collect the first frame of TOF data by using an exposure time corresponding to the light intensity.

In this embodiment, a correspondence between a plurality of light intensity ranges and exposure time is pre-configured, and the correspondence meets the following principles:

1. Light intensity ranges include indoor light intensity ranges and outdoor light intensity ranges.

Pre-configured fixed exposure time may not apply to an outdoor environment, so that exposure time used in an indoor environment is different from that used in an outdoor environment. Therefore, it is necessary to use light intensity ranges to reflect such difference.

Further, it is necessary to further distinguish exposure parameters used in different light intensity ranges in an outdoor environment, because light intensity varies over a wide range.

2. A larger value in each light intensity range corresponds to a shorter exposure time.

A longer exposure time corresponds to a brighter image. Therefore, in an outdoor environment, it is necessary to shorten the exposure time to avoid the problem that definition is reduced due to excessive brightness of the image.

An example of a correspondence configured based on the foregoing principles is as follows:

$L<=500$ lux, $t=1$ ms (default fixed value);
500 lux$<L<=3000$ lux, $t=0.7$ ms;
3000 lux$<L<=30000$ lux, $t=0.5$ ms;
$L>30000$ lux, $t=0.3$ ms.

In the foregoing example, L represents a light intensity value, t represents an exposure time, and $L<=500$ lux is an indoor light intensity range, that is, the electronic device may be considered to be in an indoor environment if L is less than 500 lux. In this case, the default fixed exposure time may be used.

500 lux$<L<=3000$ lux, 3000 lux$<L<=30000$ lux and $L>30000$ lux are ranges further divided for the outdoor environment. It can be learned that among the three ranges, a range with larger values corresponds to a shorter exposure time.

It may be understood that granularity of the intensity ranges in the outdoor environment in the foregoing example may be adjusted. A smaller granularity indicates a finer control over the exposure time, a higher image quality, and a higher image processing speed.

It may be understood that the camera HAL3 may transmit, through the TOF camera driver, the exposure time corresponding to light intensity to the TOF sensor controller of the TOF camera.

It can be learned that, in this embodiment, an exposure time for collecting TOF data is acquired based on light intensity of an environment in which the electronic device is located. Therefore, it facilitates the collection of TOF data with brightness meeting the requirements of face recognition in the first frame, thereby improving the accuracy and speed of face recognition.

Figure 13:
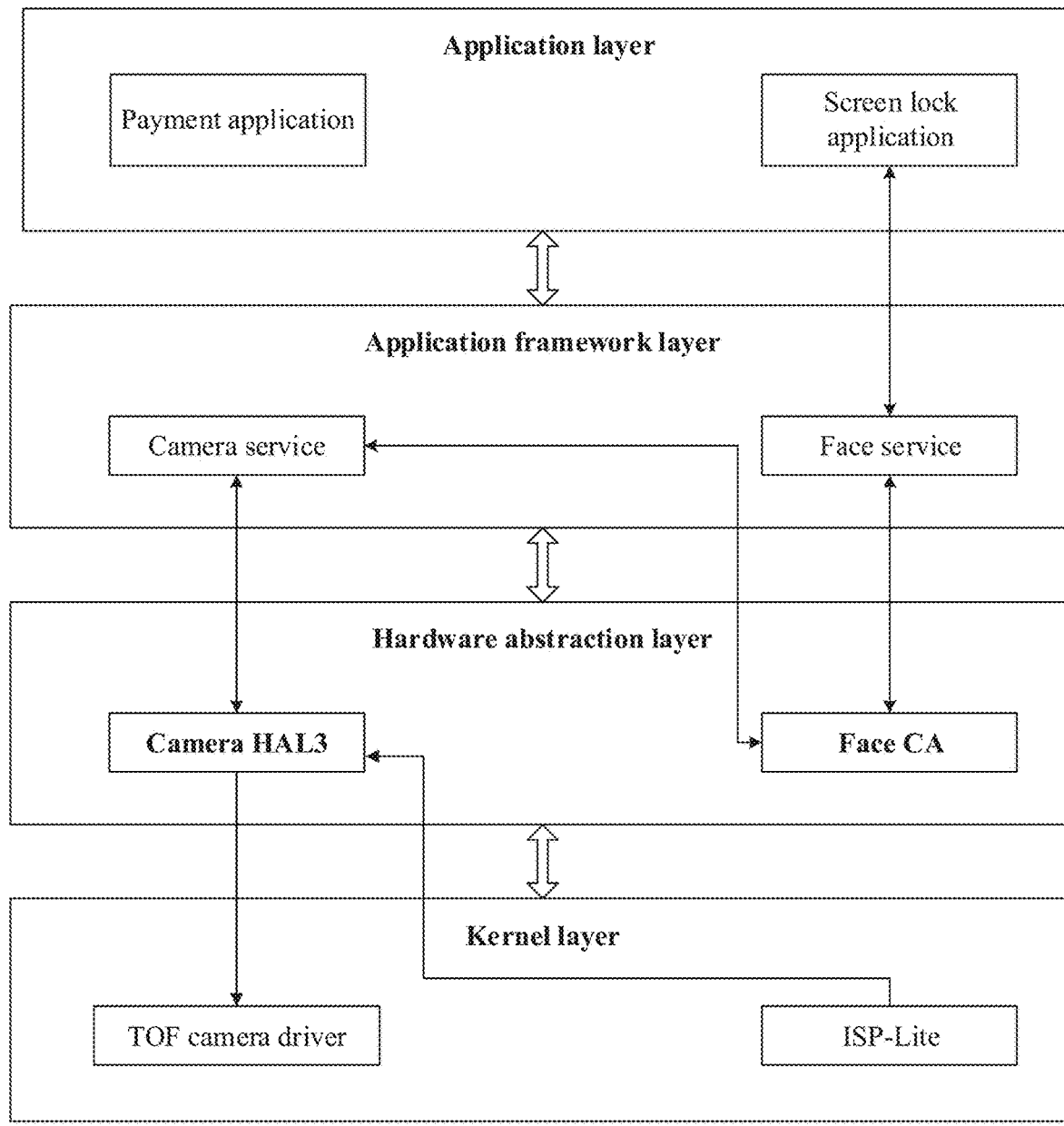
FIG. 13 is a schematic diagram of another software framework for face recognition of an electronic device.

It should be noted that the procedures shown in FIG. 7A-FIG. 7B to FIG. 12 are not limited to the software framework shown in FIG. 3, but may also be applied to the software framework shown in FIG. 13.

In FIG. 13, TEE is not set, that is, TOF data processing and face recognition are performed in the REE, specifically, may be performed in the face CA. Therefore, TOF data, rather than storage information of the TOF data, may be transmitted directly between modules. That is, FIG. 13 differs from FIG. 3 in that: after receiving TOF data collected by the TOF camera, the ISP-Lite transmits the TOF data to the face CA through the camera HAL3 and the camera service. Then the face CA processes the TOF data into a TOF image, and performs face recognition by using the TOF image.

Based on FIG. 13, in the procedure shown in FIG. 7A-FIG. 7B, all steps are performed by the face CA. After receiving a first frame of TOF data, the face CA processes the first frame of TOF data into a first frame of TOF image and obtains a first AE result. The first AE result is transmitted to the camera HAL3, and the first frame of TOF image is used for face recognition to obtain a first recognition result. If the first recognition result indicates that the recognition succeeds, the first recognition result is transmitted to the face service; or if the first recognition result indicates that the recognition fails, a seventh frame of TOF data is received again.

Based on FIG. 13, in the procedure shown in FIG. 8A-FIG. 8B, all steps are performed by the face CA. Details are not described herein again.

Based on FIG. 13, in the procedure shown in FIG. 10, it is only necessary to replace the data processing module with the face CA. Details are not described herein again.

The procedures shown in FIG. 11 and FIG. 12 are applicable to FIG. 13.

It may be understood that the procedures shown in FIG. 7A-FIG. 7B to FIG. 12 are not limited to the Android operating system. In other operating systems, modules with the same function as the data module may implement the steps performed by the data module, and modules with the same function as the camera HAL3 may implement the steps performed by the camera HAL3.

It may be understood that each module in the software framework shown in FIG. 3 may be split or combined based on functions to achieve transformation. For example, a TOF TA is added to the TEE to achieve the functions of the face TA to schedule the data processing module and transmit AE results or security identifiers, while the face TA is only configured to schedule the face recognition module. Correspondingly, modules such as a TOF CA that communicates with the TOF TA are added to the REE, and data transmission paths in the REE may be adaptively adjusted.

The procedures shown in FIG. 7A-FIG. 7B to FIG. 12 are also applicable to the software framework subjected to the transformation, and some functions may be implemented by adaptively adjusting an execution module.

An embodiment of this application further discloses a chip system, including: at least one processor and an interface, where the interface is configured to receive code instructions and transmit the code instructions to the at least one processor; and the at least one processor runs the code instructions to implement at least one of the face recognition method, the data acquisition method, and the data processing method.

For a specific procedure of implementing the foregoing functions by the processor, refer to the foregoing embodiments. Details are not described herein again.

An embodiment of this application further discloses a computer-readable storage medium, where the storage medium stores program code, and the program code, when executed by a computer device, implements at least one of the face recognition method, the data acquisition method, and the data processing method according to the foregoing embodiments.

What is claimed is:

1. A data processing method, comprising:
acquiring time-of-flight (TOF) data, wherein the TOF data comprises a plurality of security indicator frames and a plurality of face recognition frames, wherein the TOF data is TOF data collected by a TOF camera triggered by a task request from an application, and wherein the plurality of security indicator frames carry eye safety flags used to indicate that infrared light emitted by the TOF camera is safe for human eyes;
processing a first face recognition frame in the plurality of face recognition frames into a first frame of a TOF image;
performing face recognition by using the first frame of the TOF image to obtain a first recognition result;
extracting a first eye safety flag from a first security indicator frame of the plurality of security indicator frames;
determining whether the infrared light emitted by the TOF camera is safe for human eyes based on the first eye safety flag;
adjusting the TOF camera by turning off the TOF camera or reducing emission intensity of a TOF light source of the TOF camera based on determining that the infrared light emitted by the TOF camera is unsafe for human eyes based on the first eye safety flag; and
collecting face recognition frames of the plurality of face recognition frames and identifying the collected face recognition frames as face recognition frames for the face recognition based on determining that the infrared light emitted by the TOF camera is safe for human eyes based on the first eye safety flag.

2. The data processing method of claim 1, wherein the acquiring TOF data comprises:
acquiring the TOF data by using preset fixed exposure parameters.

3. The data processing method of claim 1, wherein one processor is used for serially executing: (1) the processing the first face recognition frame in the plurality of face recognition frames into the first frame of the TOF image, and (2) the performing face recognition by using the first frame of the TOF image to obtain the first recognition result.

4. The data processing method of claim 1, further comprising:
executing a task by using the first recognition result.

5. The data processing method of claim 4, wherein the executing the task by using the first recognition result comprises:
executing a first task based on the first recognition result indicating that the performing face recognition succeeds.

6. The data processing method of claim 5, wherein the executing the task by using the first recognition result further comprises:
executing a second task based on the first recognition result indicating that the performing face recognition fails and the first recognition result meeting a preset ending condition, wherein the preset ending condition comprises a condition that a time for executing the task reaches a preset time threshold.

7. The data processing method of claim 5, wherein the executing the task by using the first recognition result further comprises:
acquiring and using a recognition result of another face recognition frame in response to the task based on the first recognition result indicating that the performing face recognition fails and the first recognition result not meeting a preset ending condition.

8. The data processing method of claim 7, wherein the another face recognition frame is collected by using exposure parameters adjusted based on a first automatic exposure (AE) result, and the method further comprises:
acquiring the first AE result after the collecting the first face recognition frame.

9. The data processing method of claim 1, wherein the performing face recognition by using the first frame of the TOF image to obtain the first recognition result comprises:
receiving, by a face trusted application in a trusted execution environment (TEE), storage information of the first frame of the TOF image, and then transmitting, by the face trusted application, the storage information of the first frame of the TOF image to a face recognition system;

reading, by the face recognition system, the first frame of the TOF image based on the storage information of the first frame of TOF image; and performing, by the face recognition system, face recognition on the first frame of the TOF image to obtain the first recognition result.

10. The data processing method of claim 9, wherein the processing the first face recognition frame into the first frame of the TOF image comprises:

receiving, by the face trusted application, storage information of the first face recognition frame, and then transmitting, by the face trusted application, the storage information of the first face recognition frame to a data processing system;

reading, by the data processing system, the first face recognition frame based on the storage information of the first face recognition frame; and processing, by the data processing system, the first face recognition frame into the first frame of the TOF image.

11. The data processing method of claim 10, further comprising:

storing, by the data processing system, the first frame of the TOF image, and transmitting the storage information of the first frame of the TOF image to the face trusted application.

12. The data processing method of claim 1, wherein the performing face recognition by using the first frame of the TOF image to obtain the first recognition result comprises:

generating, by a face client application at a hardware abstraction layer, the first frame of the TOF image, and then performing face recognition by using the first frame of the TOF image to obtain the first recognition result.

13. The data processing method of claim 12, wherein the processing the first frame of the TOF data into the first frame of the TOF image comprises:

receiving, by the face client application, the first face recognition frame, and processing the first face recognition frame into the first frame of the TOF image.

14. An electronic device, comprising:

a time-of-flight (TOF) camera configured to collect TOF data;

one or more processors; and one or more storage devices storing instructions that are operable, when executed by the one or more processors, to cause the one or more processors to perform operations comprising:

acquiring the time-of-flight (TOF) data, wherein the TOF data comprises a plurality of security indicator frames and a plurality of face recognition frames, wherein the TOF data is TOF data collected by the TOF camera triggered by a task request from an application, and wherein the plurality of security indicator frames carry eye safety flags used to indicate that infrared light emitted by the TOF camera is safe for human eyes;

processing a first face recognition frame in the plurality of face recognition frames into a first frame of a TOF image;

performing face recognition by using the first frame of the TOF image to obtain a first recognition result;

extracting a first eye safety flag from a first security indicator frame of the plurality of security indicator frames;

determining whether the infrared light emitted by the TOF camera is safe for human eyes based on the first eye safety flag;

adjusting the TOF camera by turning off the TOF camera or reducing emission intensity of a TOF light source of the TOF camera based on determining that the infrared light emitted by the TOF camera is unsafe for human eyes based on the first eye safety flag; and collecting face recognition frames of the plurality of face recognition frames and identifying the collected face recognition frames as face recognition frames for the face recognition based on determining that the infrared light emitted by the TOF camera is safe for human eyes based on the first eye safety flag.

15. The electronic device of claim 14, wherein one processor is used for serially executing: (1) the processing the first face recognition frame in the plurality of face recognition frames into the first frame of the TOF image, and (2) the performing face recognition by using the first frame of the TOF image to obtain the first recognition result.

16. The electronic device of claim 14, the operations further comprising:

executing a task by using the first recognition result.

17. The electronic device of claim 16, wherein the executing the task by using the first recognition result comprises:

executing a first task based on the first recognition result indicating that the performing face recognition succeeds.

18. The electronic device of claim 17, wherein the executing the task by using the first recognition result further comprises:

executing a second task based on the first recognition result indicating that the performing face recognition fails and the first recognition result meeting a preset ending condition, wherein the preset ending condition comprises a condition that a time for executing the task reaches a preset time threshold.

19. A chip system, comprising:

at least one processor; and an interface, wherein the interface is configured to receive code instructions and transmit the code instructions to the at least one processor, wherein the at least one processor is configured to run the code instructions to implement operations comprising:

acquiring time-of-flight (TOF) data, wherein the TOF data comprises a plurality of security indicator frames and a plurality of face recognition frames, wherein the TOF data is TOF data collected by a TOF camera triggered by a task request from an application, and wherein the plurality of security indicator frames carry eye safety flags used to indicate that infrared light emitted by the TOF camera is safe for human eyes;

processing a first face recognition frame in the plurality of face recognition frames into a first frame of a TOF image;

performing face recognition by using the first frame of the TOF image to obtain a first recognition result;

extracting a first eye safety flag from a first security indicator frame of the plurality of security indicator frames;

determining whether the infrared light emitted by the TOF camera is safe for human eyes based on the first eye safety flag;

adjusting the TOF camera by turning off the TOF camera or reducing emission intensity of a TOF light source of the TOF camera based on determining that the infrared light emitted by the TOF camera is unsafe for human eyes based on the first eye safety flag; and collecting face recognition frames of the plurality of face recognition frames and identifying the collected face recognition frames as face recognition frames for the face recognition based on determining that the infrared light emitted by the TOF camera is safe for human eyes based on the first eye safety flag.

* * * * *

UNITED STATES PATENT AND TRADEMARK OFFICE
CERTIFICATE OF CORRECTION

| | | |
|---|---|---|
| PATENT NO. | : 12,283,128 B2 | Page 1 of 1 |
| APPLICATION NO. | : 17/983650 | |
| DATED | : April 22, 2025 | |
| INVENTOR(S) | : Yuan et al. | |

It is certified that error appears in the above-identified patent and that said Letters Patent is hereby corrected as shown below:

On the Title Page

Item [71]: "Honor Device Co., Ltd., Guangdong (CN)" should read -- Honor Device Co., Ltd., Shenzhen (CN) --.

In the Claims

Claim 19, Column 31, Line 8: "based on the first eve safety flag." should read -- based on the first eye safety flag. --.

Signed and Sealed this
Seventeenth Day of June, 2025

Coke Morgan Stewart
*Acting Director of the United States Patent and Trademark Office*